(12) United States Patent
Kang

(10) Patent No.: US 7,792,357 B2
(45) Date of Patent: Sep. 7, 2010

(54) CHROMATIC ABERRATION CORRECTION

(75) Inventor: Sing Bing Kang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 769 days.

(21) Appl. No.: 11/755,357

(22) Filed: May 30, 2007

(65) Prior Publication Data

US 2008/0298678 A1 Dec. 4, 2008

(51) Int. Cl.
*G06K 9/00* (2006.01)
(52) U.S. Cl. .................. 382/167; 382/162; 382/163
(58) Field of Classification Search ............... 382/169, 382/176, 162, 133, 163; 348/222.1, 362; 250/458.1, 461.1; 358/523; 600/476, 125
See application file for complete search history.

(56) References Cited

U.S. PATENT DOCUMENTS

| | | | |
|---|---|---|---|
| 4,724,395 A | 2/1988 | Freeman | |
| 5,031,227 A | 7/1991 | Raasch et al. | |
| 5,469,239 A | 11/1995 | Ishida et al. | |
| 5,629,734 A | 5/1997 | Hamilton, Jr. | |
| 5,867,285 A | 2/1999 | Hirota et al. | |
| 6,173,085 B1 | 1/2001 | Hamilton, Jr. et al. | |
| 6,195,467 B1 | 2/2001 | Asimopoulos | |
| 6,266,439 B1 | 7/2001 | Pollard et al. | |
| 6,323,959 B1 | 11/2001 | Toyama et al. | |
| 6,327,078 B1 | 12/2001 | Lee | |
| 6,363,220 B1 | 3/2002 | Ide | |
| 6,438,270 B1 | 8/2002 | Harrington | |
| 6,587,224 B1 | 7/2003 | Nabeshima et al. | |
| 6,614,474 B1 | 9/2003 | Malkin et al. | |
| 6,628,329 B1 | 9/2003 | Kelly et al. | |
| 6,697,522 B1 | 2/2004 | Ishikawa | |
| 6,757,426 B2 * | 6/2004 | Link et al. | 382/163 |

(Continued)

FOREIGN PATENT DOCUMENTS

JP 2000092335 * 3/2000

(Continued)

OTHER PUBLICATIONS

Kang, "Automatic Removal of Chromatic Aberration from a Single Image", IEEE, 2007, pp. 1-8.*

(Continued)

*Primary Examiner*—Anh Hong Do
(74) *Attorney, Agent, or Firm*—Lyon & Harr, LLP; Richard T. Lyon

(57) ABSTRACT

A chromatic aberration (CA) correction technique is presented that substantially removes CA from an image captured by a digital camera. In general, the effects of any in-camera sharpening are reversed by applying a blurring kernel. The image is then super-sampled to approximate its state prior to the application of in-camera sampling. One of the color channels is designated as a reference channel, and an objective function is established for each of the non-reference channels. The reference color channel is assumed to be CA-free, while the objective functions are used to compute the unknown CA parameters for each non-reference channel. These sets are used in a CA removal function to substantially remove the CA associated with each of the non-reference channels. The image is then sampled to return it to its original resolution, and a sharpening filter is applied if needed to undo the effects of the previously applied blurring kernel.

20 Claims, 12 Drawing Sheets

U.S. PATENT DOCUMENTS

| | | | |
|---|---|---|---|
| 6,879,735 | B1 | 4/2005 | Portniaguine et al. |
| 6,915,024 | B1 | 7/2005 | Maurer |
| 7,459,696 | B2 * | 12/2008 | Schomacker et al. ..... 250/458.1 |
| 7,463,769 | B2 * | 12/2008 | Lin et al. ................... 382/169 |
| 2004/0036923 | A1 | 2/2004 | Kokemohr et al. |
| 2004/0109614 | A1 | 6/2004 | Enomoto et al. |
| 2004/0247195 | A1 | 12/2004 | Chauville et al. |
| 2006/0093234 | A1 | 5/2006 | Silverstein |

FOREIGN PATENT DOCUMENTS

WO     WO-2005089369 A1     9/2005

OTHER PUBLICATIONS

Boult, T. E., G. Wolberg, Correcting chromatic aberrations using image warping, IEEE Comp. Soc. Conf. on Proc. of Comp. Vision and Pattern Recognition, Jun. 15-18, 1992, pp. 684-668, Champaign, IL, USA.

Colomb, T., F. Montfort, J. Kühn, N. Aspert, E. Cuche, A. Marian, F. Charriére, S. Bourquin, P. Marquet, C. Depeursinge, Numerical parametric lens for shifting, magnification, and complete aberration compensation in digital holographic microscopy, J. Optical Soc. of Am. A: Optics Image Science Vision, Dec. 23, 2006 vol. 23, No. 12, pp. 3177-3190.

Evennett, P., The new photomicrography, Proceedings of the Royal Microscopical Society, 2000, pp. 253-256, vol. 35.

Farrar, N. R., A. H. Smith, D. R. Busath, and D. Taitano, In-situ measurement of lens aberrations, Society of Photo-Optical Instrumentation Engineers, 2000, pp. 18-29, vol. 4000, No. 1.

Nayar, S. K., M. Watanabe, and M. Noguchi, Real-time focus range sensor, Int'l Conf. on Comp. Vision, 1995, pp. 995-1001.

Pillman, B. H., Impact of CCD size, pixel pitch, and anti-aliasing filter design on sharpness of digital camera print, PICS 2000: Image Processing, Image Quality, Image Capture, Systems Conf., Mar. 2000, pp. 216-220, Portland, OR, USA.

Willson, R. G., S. A. Shafer, Active lens control for high precision computer imaging, Proc. IEEE Int'l Conf. on Robotics and Automation, (ICRA '91), Apr. 1991, pp. 2063-2070, vol. 3.

Tumblin, J., Turk, G., LCIS: A boundary hierarchy for detail-preserving contrast reduction, ACM SIGGRAPH '99 Conference Proceedings, Annual Conference Series, Aug. 8-13, 1999, pp. 83-90, Los Angeles, California.

Luft, T., C. Colditz, O. Deussen, Image enhancement by unsharp masking the depth buffer, Int'l Conf. on Computer Graphics and Interactive Techniques, 2006, pp. 1206-1213, Boston, Massachusetts.

Dorney, T., S. Bhashyam, A. Doran, H. Choi, P. Flandrnin, and R. Baraniuk, Edge localized image sharpening via reassignment with application to computed tomography, SPIE TEchnical Conf. on Mathematical Modeling, Estimation and Imaging, Jul. 2000, pp. 218-227, vol. 4121, San Diego, CA.

Gilboa, G., N. Sochen, Y. Y. Zeevi, Image sharpening by flows based on triple well potentials, J. of Mathematical Imaging and Vision, 2004, pp. 121-131, vol. 20.

Hayes, M. P. and S. A. Fortune, Recursive phase estimation for image sharpening, Image and Vision Computing New Zealand, Nov. 2005, University of Otago, Dunedin, New Zealand.

Jaspers, E. G. T., and P. H. N. de With, A generic 2D sharpness enhancement algorithm for luminance signals, IEEE Int'l Conf. Image Processing Applications, 1997, pp. 263-273, vol. 1.

Saito, T., H. Harada, J. Satsumabayashi, and T. Komatsu, Color image sharpening based on nonlinear reaction-diffusion, Int'l Conf. Image Processing, 2003, pp. 389-392, vol. 3.

* cited by examiner

CHROMATIC ABERRATION CORRECTION

BACKGROUND

Many high resolution digital images exhibit chromatic aberration (CA), where the color channels appear shifted. This is primarily due to the fact that as the sensor resolution of digital cameras has steadily increased over the past few years, it has not been accompanied by an increase in the quality of the optics. Unfortunately, merely compensating for these shifts is often inadequate, because the intensities are modified by other effects such as spatially-varying defocus and in-camera sharpening.

Techniques have been proposed to reduce the effects of CA. Classical techniques rely on optimal lens design or special hardware to recover the aberration coefficients through wavefront measurements (e.g., using a diffraction grating and scanning electron microscope or some form of interferometer). Others rely on primarily software solutions. One such technique involves precalibrating the color channels for optimal focus, magnification, and shift. However, producing a CA-free image subsequently requires taking three separate images, each using the optimal settings for a different color channel. Another technique uses only a single image by warping the red and green color channels to the blue channel. This is accomplished by filting edge displacements with cubic splines, with blue edges as the reference. However, they do not account for the attendant relative defocus and intensity distortion (e.g., under- and over-shooting) effects. In addition, because the displacement maps computed as part of this technique do not explicitly model the image formation process, it is not clear if the extracted maps can be used to correct a different image taken by the same camera. This is because the extracted maps are highly dependent on the relative density and distribution of the edges, which are typically unique to each image.

SUMMARY

This Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

The present chromatic aberration (CA) correction technique combines the basic principles of sampling, defocusing, magnification, and optionally sharpening to model chromatic aberration. These modeled steps are effectively reversed to substantially remove CA from an image, and then the image is re-sampled and sharpened as desired.

In general, assuming in-camera sharpening was applied to an image being processed to correct for CA, the present technique involves first identifying edge pixels in the image at locations where there is a readily identifiable, substantially co-located edge in each color channel. In addition, pixels within a prescribed distance from the edge pixels are identified. The effects of the in-camera sharpening are then reversed by applying a blurring kernel. Next, the image is super-sampled to approximate the image as it existed prior to the aforementioned sampling, and one of the color channels is designated as the reference channel. An objective function is then established for each of the non-reference color channels. This objective function represents the difference between the un-sharpened intensity of an identified pixel with regard to the reference color channel and the un-sharpened intensity of that pixel with regard to the non-reference color channel under consideration, after applying a CA removal function to the non-reference color channel pixel that substantially removes the effects of CA. The CA removal function includes a number of unknown CA parameters associated with the CA effect. The set of CA parameters that minimizes the objective function across all the identified pixels is computed for each non-reference color channel. This set of CA parameters is then used in the CA removal function associated with the non-reference color channel under consideration to compute a new substantially CA-free intensity value for each pixel in the image for that color channel. The image is then sampled to return it to its original resolution, and a sharpening filter is applied to substantially undo the effects of the previously applied blurring kernel.

In a case where there was no in-camera sharpening, the foregoing technique is the same, except the actions of applying a blurring kernel to produce un-sharpened intensity values and applying a sharpening filter to the image to substantially undo the effects of the previously applied blurring kernel, are not performed. In addition, the objective function would be constructed using the original intensities of the identified pixels, rather than un-sharpened intensities.

It is noted that while the foregoing limitations in existing methods for reducing the effects of CA described in the Background section can be resolved by a particular implementation of a CA correction technique according to the present invention, this is in no way limited to implementations that just solve any or all of the noted disadvantages. Rather, the present technique has a much wider application as will become evident from the descriptions to follow. In addition, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present chromatic aberration (CA) correction technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
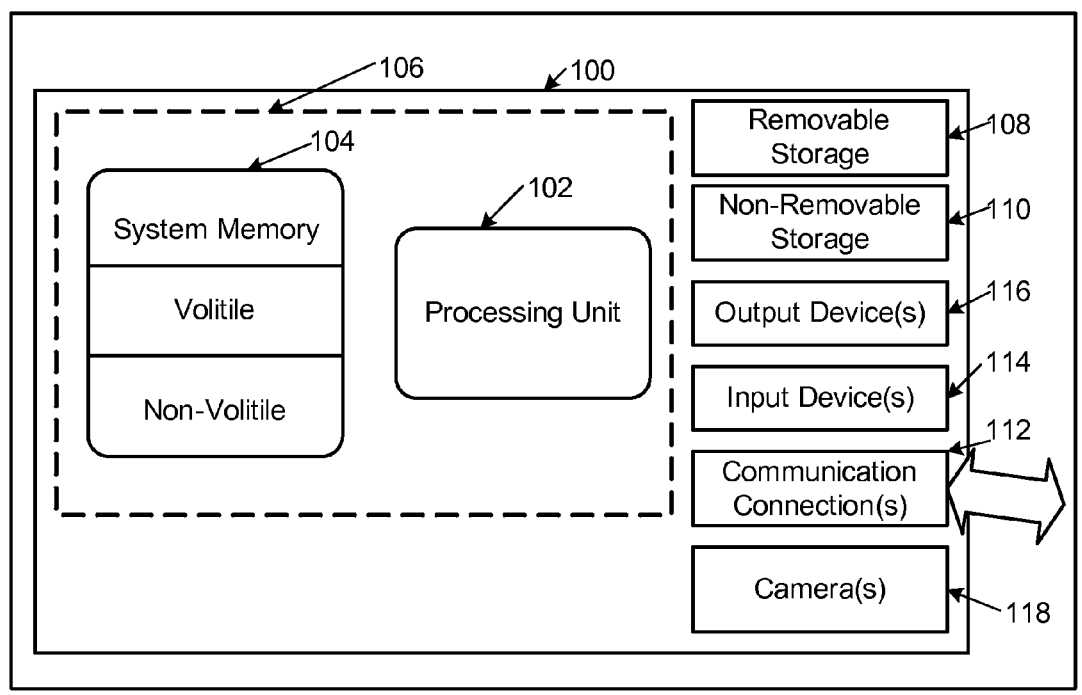
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present CA correction technique. Neither should the computing environment be interpreted as having any dependency or requirement relating to any one or combination of components illustrated in the exemplary operating environment. With reference to FIG. 1, an exemplary system for implementing the present technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Of particular note is that device 100 can include a camera 118 (such as a digital/electronic still or video camera), which is capable of capturing a sequence of images, as an input device. Further, multiple cameras 118 could be included as input devices. The images from the one or more cameras are input into the device 100 via an appropriate interface (not shown). However, it is noted that image data can also be input into the device 100 from any computer-readable media as well, without requiring the use of a camera.

The present CA correction technique may be described in the general context of computer-executable instructions, such as program modules, being executed by a computing device. Generally, program modules include routines, programs, objects, components, data structures, etc. that perform particular tasks or implement particular abstract data types. The present technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present CA correction technique.

2.0 Chromatic Aberration (CA) Correction

Before the present CA correction technique is described, a review of a few important optical concepts will be helpful in understanding the causes of the problem.

2.1 Optical Aberrations

Optical aberrations are categorized as monochromatic or chromatic. In the mathematical treatment of geometrical imagery, now known as aberration theory, there are five primary monochromatic aberrations, distortion (the familiar barrel or pincushion distortion), spherical aberration, coma, astigmatism, and field curvature. Chromatic aberrations are caused by the refractive index of the lens being wavelength dependent, and can be separated into longitudinal and lateral components. The term chromatic aberration (CA) refers to the combination of longitudinal and lateral aberrations. The effect of CA is tightly coupled with the notions of field curvature and astigmatism.

2.1.1 Field Curvature and Astigmatism

Figure 2:
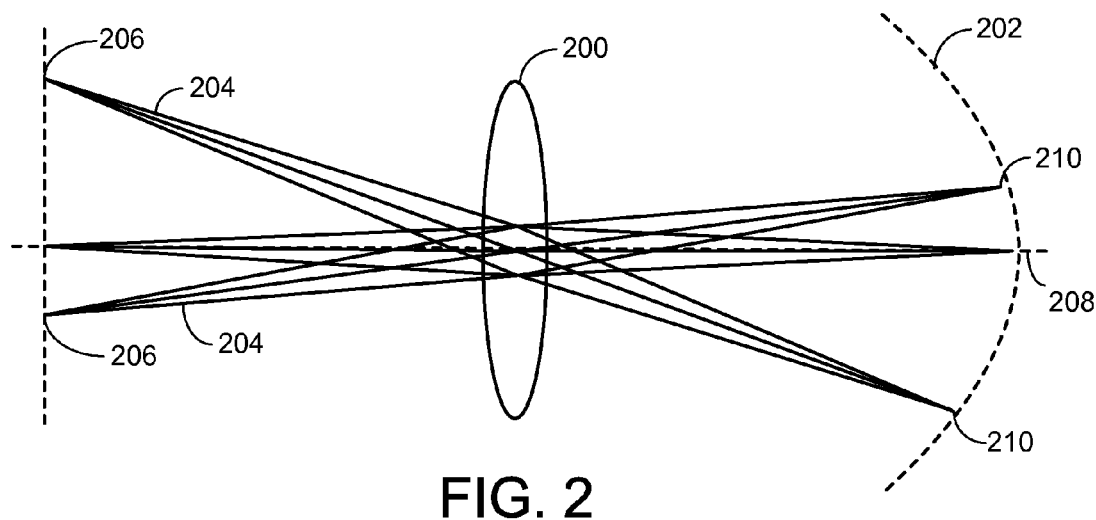
FIG. 2 is a diagram illustrating field curvature in a typical camera.

The ideal imaging surface is flat (i.e., having a flat field) and coincident with the sensor surface of the camera. In reality, for a typical camera, the off-axis parts of the image are closer to the lens 200 than the on-axis parts creating a curved field 202, as shown in FIG. 2. In other words, rays 204 coming from object points 206 equidistant from the lens 200 but at different distances from the optical axis 208, are focused at points 210 that are different distances from the lens. In the absence of all other aberrations, the curved image field is known as the Petzval surface.

Figure 3:
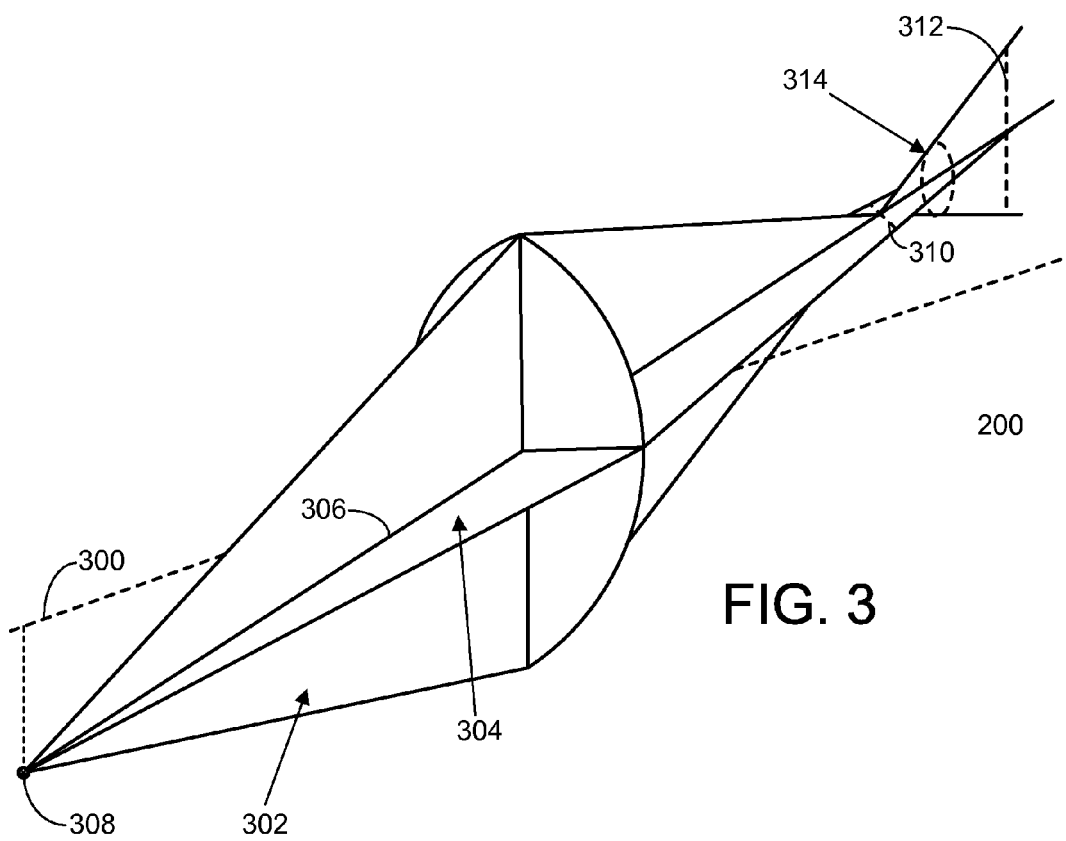
FIG. 3 is a diagram illustrating astigmatism in a typical camera.

Referring to FIG. 3, in an optical system, a plane containing the optical axis 300 is called the tangential or meridional plane 302. The sagittal plane 304 is orthogonal to the tangential plane 302 and intersects it along the chief (or primary) ray 306 of an object 308. Astigmatism refers to the phenomenon where rays coming from the object focus in two lines on different surfaces, as shown in FIG. 3. One focused line 310 corresponds to the rays in the tangential plane 302, while the other line 312 corresponds to the rays in the sagittal plane 304. The "best" image of the object 308 is considered to be at a location halfway between these two surfaces; this location yields what is called the circle of least confusion 314.

The combination of field curvature and astigmatism produces a more complex "best" imaging surface, which is referred to as the focal surface. As will be described in more detail later, the present technique generally attempts to recover the relative focal surface using the green channel as reference. Green is chosen as the reference due to its implicit higher reliability, since the number of green samples in a raw Bayer mosaic image (for single CCD sensors) are twice those for red and blue. It is also believed the green channel tends to be the sharpest.

2.1.2 Chromatic and Spherical Aberrations

Figure 4:
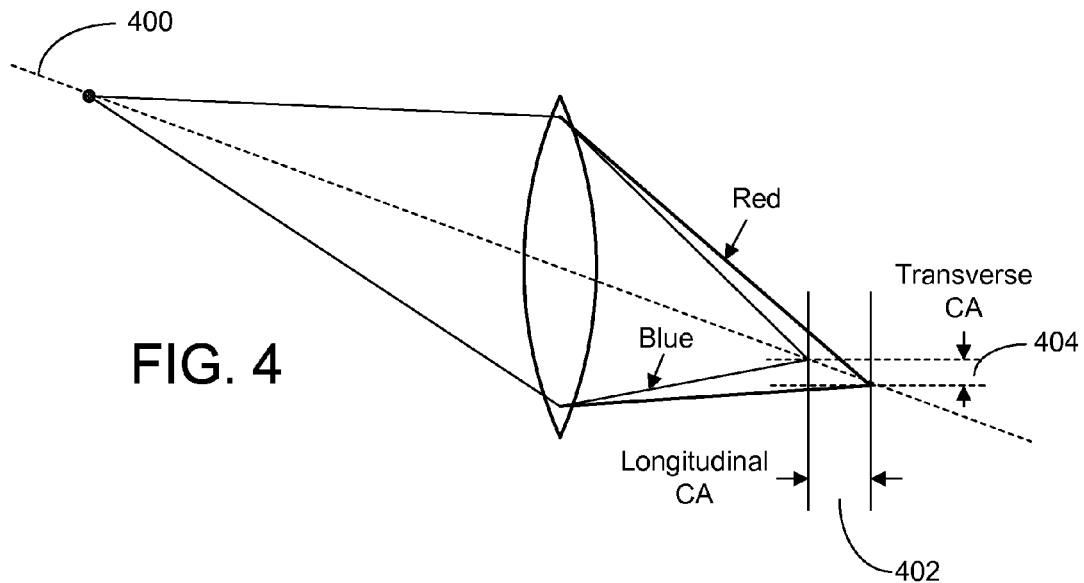
FIG. 4 is a diagram illustrating longitudinal and lateral chromatic aberration in a typical camera.

Lens properties vary with wavelength because the index of refraction is wavelength dependent. In addition to the monochromatic aberrations, chromatic aberration contains wavelength dependent shifts in focus. Referring to FIG. 4, these shifts can be decomposed into longitudinal chromatic aberration (i.e., shifts 402 along the optical axis 400) and lateral chromatic aberration (i.e., shifts 404 perpendicular to the optical axis 400). Note that only red and blue rays are shown.

Lateral chromatic aberration, otherwise known as transverse chromatic aberration, combines with spherical aberration (which is a function of aperture radius) to determine the image height of a colored ray. This combined effect is called spherochromatic aberration (SCA) or Gauss error. For the purposes of this description, CA actually refers to the combination of conventional CA and spherical aberration.

2.2 The CA Correction Technique

Figure 5:
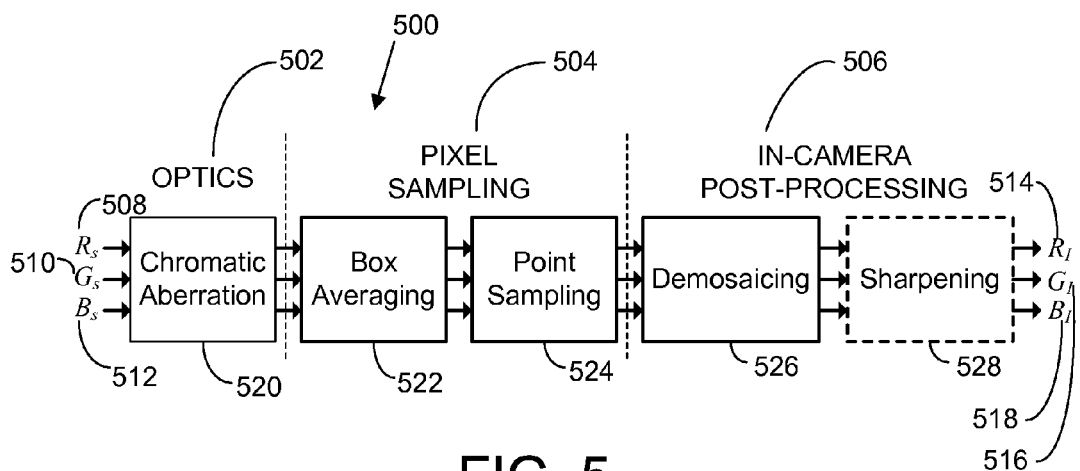
FIG. 5 is a block diagram illustrating a simplified imaging pipeline for a typical digital camera.

FIG. 5 illustrates a simplified imaging pipeline 500 used in the following analysis. The pipeline consists of optics 502, pixel sampling 504, and in-camera post-processing 506 modules, in that order. Note that other optical effects such as radial distortion and vignetting, which can be estimated independently, are outside the scope of the present technique, and so will not be described herein or shown in the pipeline 500. $R_s$, $G_s$, $B_s$ (508, 510, 512) are incident continuous scene colors and $R_I$, $G_I$, $B_I$ (514, 516, 518) are the observed discrete image colors. The optical stage 502 of the pipeline 500 includes light rays entering the camera through the lens and impinging on the sensors. This is where CA occurs, as represented by block 520. As indicated earlier, CA is wave-length dependent, and so each scene color is affected differently. The pixel sampling module 504 of the pipeline 500 is generally characterized in two parts—namely, box averaging 522 followed by point sampling 524. Each of these will be described in more detail later. The last part of the pipeline 500 is the in-camera post processing module 506. This stage is generally represented as including demosaicing 526 and optional image sharpening 528. The optional nature of the image sharpening is indicated by the dashed line block used in FIG. 5.

In regard to the in-camera processing stage, a number of assumptions have been made to simplify the analysis. First, it is assumed that the effects of demosaicing (i.e., the process of raw-to-color conversion) are relatively small compared to all the other effects, and can be ignored. In-camera color transformation used for white balancing is also ignored, and it is assumed that the image aspect ratio is one.

In regard to the image sharpening, single CCD-based cameras use optical and electrical low-pass filters to reduce aliasing caused by the mosaic array in front of the sensor. For a given CCD size and pixel pitch, the anti-aliasing filter design has a significant impact on the reduced sharpness of the image. Many digital cameras, by default, apply some amount of internal sharpening in an attempt to counteract the reduced sharpness. This sometimes has the effect of significantly enhancing jaggies, noise, and other artifacts such as ringing. Additionally, in the context of the present technique, the sharpening will have an effect on the ability to estimate and correct CA.

It is noted that for the purposes of the following description of the present CA correction technique, it will assumed that in-camera image sharpening is performed. However, following that, the differences in the technique should the image sharpening be absent will be described as well.

Figure 6:
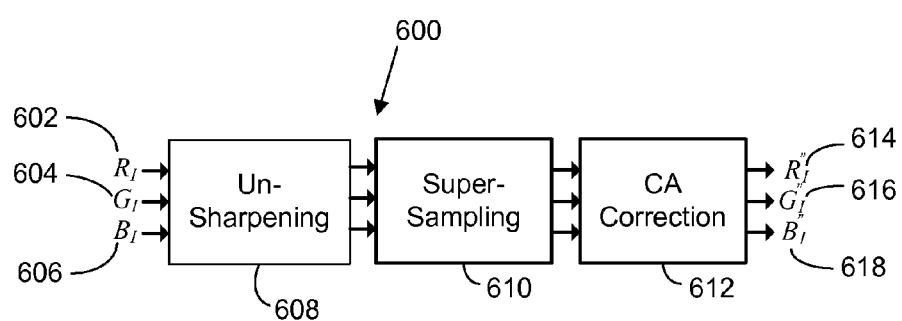
FIG. 6 is a block diagram showing an exemplary program module architecture associated with the present chromatic aberration (CA) correction technique.

Given that in-camera image sharpening will affect estimating and correcting CA, its effects must be reversed before the CA can be effectively removed. This is also true of the pixel sampling stage. FIG. 6 shows a simplified exemplary architecture of a reverse imaging pipeline 600 used for correcting CA in an image. The modules of this pipeline can reside on a computing device such as one of those described previously in the exemplary operating environment section. For the purposes of the example reversed pipeline shown in FIG. 6, it is assumed the color channels are red (R), green (G) and blue (B). In this case, the observed discrete image colors $R_I$, $G_I$, $B_I$ (602, 604, 606) from the image are the input to the pipeline 600. The effects of in-camera image sharpening are then reversed in an unsharpening module 608. It is noted that the result of the previously mentioned pixel sampling phase of the imaging pipeline was to convert the continuous image signal impinging on the camera sensor to a discrete, pixel-based image signal. As will be described in more detail later, this sampling process cannot actually be reversed. Instead, the image is super-sampled to approximate the characteristics of the original continuous signal. This is accomplished in the super-sampling module 610. The effects of CA are then estimated from the super-sampled image signal and substantially removed in the CA correction module 612. As part of the correction procedure, the CA correction module 612 samples the CA corrected signal to return it to the original resolution and sharpens the pixels. The result is the output of discrete image colors from which the CA has been substantially removed in the case of the color channels not chosen as the reference channel (e.g., the red and blue channels). In FIG. 6, these are depicted as $R_I''$ (614) and $B_I''$ (618). In addition, a potentially modified version of the original discrete image color chosen as the reference channel (e.g., the green channel) is output. In FIG. 6, this output is depicted as $G_I''$ (616). As will be described shortly the reference channel is assumed to have negligible CA and so not in need of correcting. However, if it underwent in-camera sharpening, the color channel chosen as the reference channel would have been modified in that it is first unsharpened in the unsharpening module 608 and then re-sharpened in the CA correction module 612. This may not exactly reproduce the corresponding input channel depending on the methods used in the unsharpening and resharpening.

Figure 7A:
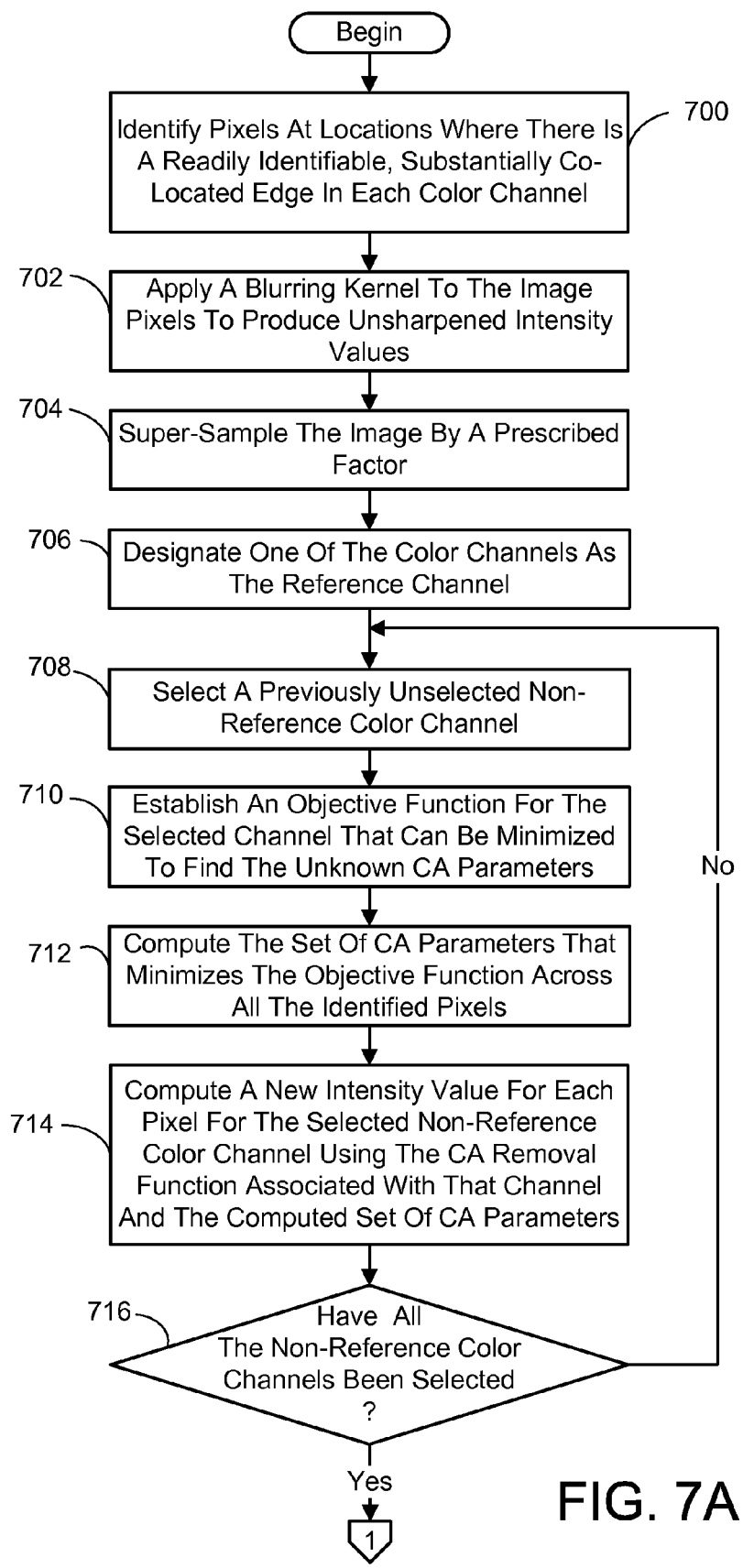
FIGS. 7A-B are a continuing flow diagram generally outlining one embodiment of a process for substantially removing CA from an image captured by a digital camera, according to the present CA correction technique.
Figure 7B:
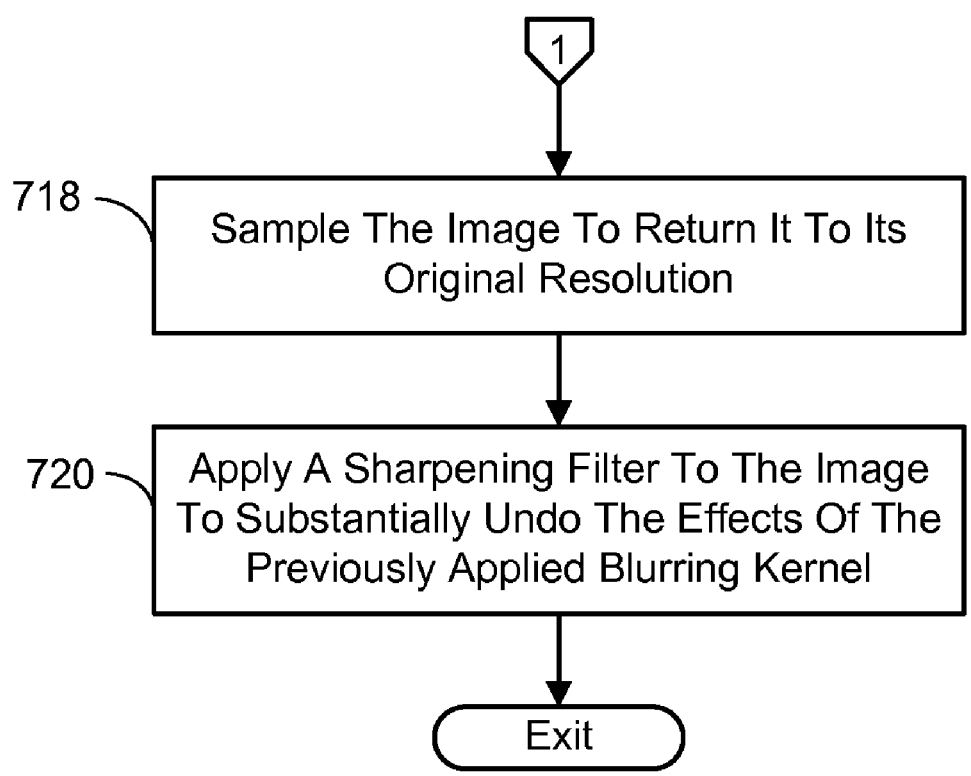

Based on the foregoing architecture of the reverse imaging pipeline described above, in one embodiment, the present CA correction technique is generally implemented as shown in the process flow diagram of FIGS. 7A-B. In this example, it is assumed in-camera sharpening was applied. The technique begins with the identification of edge pixels in the image at locations where there is a readily identifiable, substantially co-located edge in each color channel, along with pixels within a prescribed distance from the edge pixels (700). The effects of in-camera sharpening applied to the image are reversed by applying a blurring kernel to the image pixels to produce unsharpened intensity values (702). The image is then super-sampled by a prescribed factor (704). In addition, one of the color channels is designated as the reference channel (706). One of the non-reference color channels not already considered is then selected (708), and an objective function is established for the selected channel (710). This objective function represents the difference between the unsharpened intensity of an identified pixel with regard to the reference color channel and the unsharpened intensity of that pixel with regard to the selected non-reference color channel, after applying a CA removal function to the non-reference color channel pixel that substantially removes the effects of CA. This CA removal function is associated with the selected color channel and includes a number of unknown CA parameters associated with the CA effect. It will be described in more detail later in this description. Next, a set of CA parameters that minimizes the objective function across all the identified pixels is computed (712). This set of CA parameters is then used in the CA removal function associated with the selected color channel to compute a new intensity value for each pixel in the image for the selected non-reference color channel (714). It is next determined if all the non-reference color channels have been considered (716), and if not, process actions 708 through 716 are repeated. Once all the non-reference color channels have been considered, the image is sampled to return it to its original resolution (718). A sharpening filter is then applied to the image to substantially undo the effects of the previously applied blurring kernel (720), and the technique ends.

In a case where there was no in-camera sharpening, the foregoing technique is the same, except the actions of applying a blurring kernel to the image pixels to produce unsharpened intensity values and applying a sharpening filter to the image to substantially undo the effects of the previously applied blurring kernel, are not performed. In addition, the objective function would be constructed using the original intensities of the edge pixel, rather than unsharpened intensities.

The following sections will now describe the foregoing unsharpening, super-sampling and CA correction phases in more detail.

2.2.1 Un-Sharpening

As described previously, many digital cameras apply some amount of internal sharpening in an attempt to counteract the reduced sharpness caused by anti-aliasing filtering. The effects of this in-camera image sharpening are reversed as part of the CA correction technique because this sharpening affects the CA estimations. It is later re-applied. The following sub-sections first characterize the in-camera sharpening, and then describe the actions that are taken to reverse it. If there was no in-camera sharpening applied to generate the image being processed, then the un-sharpening stage is skipped.

2.2.1.1 In-Camera Sharpening

The in-camera sharpening is modeled using a separable mask $H_{Sharp}$:

$$H_{Sharp}=H_1+\lambda(H_1-H_\sigma), \quad (1)$$

where $H_1$ is a kernel with one at the center and zero everywhere else, $H_\sigma$ is a Gaussian blur kernel with parameter $\sigma$, and $\lambda$ is the amount of high-frequency contribution. Note that this particular parameterization of the mask has two degrees of freedom. If the observed discrete image is $M_I$, then $$M_I = M_d * H_{Sharp}. \quad (2)$$

A second-order approximation is used to invert the effect of sharpening, i.e., $$H_{Sharp}^{-1} \approx H_1 - \lambda(H_1-H_\sigma) + \lambda^2(H_1-H_\sigma)^2. \quad (3)$$

This is a form of blurring. This approximation works well for $\lambda<1$; $\lambda \geq 1$ results in some residual over- and undershooting.

In one embodiment of the present technique, the width of $H_{Sharp}$ and $H_{Sharp}^{-1}$, is $(2\lceil 3\sigma \rceil+1)$ pixels, with $\lceil x \rceil$ being the ceiling of x.

2.2.1.2 Finding Strong Color Edges

The present CA correction technique relies on being able to locate strong color edges that are in very close proximity to each other. In one embodiment of the present technique, this is accomplished by first applying a difference-of-Gaussians (DOG) filter over the three color channels independently. The strong edges are found by using a high threshold, and isolated edge pixels (e.g., those without any 4-connected neighbors) are removed. The local gradients allow the normals at the edge pixels to be estimated. For each edge pixel in a color band, there must be nearby edge pixels (e.g., within 2 pixels) in the other color bands; otherwise it is rejected.

2.2.1.3 Estimating $H_{Sharp}^{-1}$

The results of the edge finding procedure are used to estimate the two parameters $\lambda$ and $\sigma$ for $H_{Sharp}^{-1}$. More specifically, areas within a prescribed number of pixels (e.g., 11) of these edges are employed, using the edge locations in the green channel as reference locations. Then, the cost of ringing at the vicinity of these edges along their normal directions is defined. To reduce the amount of resampling, the analysis is computed along either the horizontal or vertical direction, depending on which is closer (in angle) to the normal direction.

Figure 8:
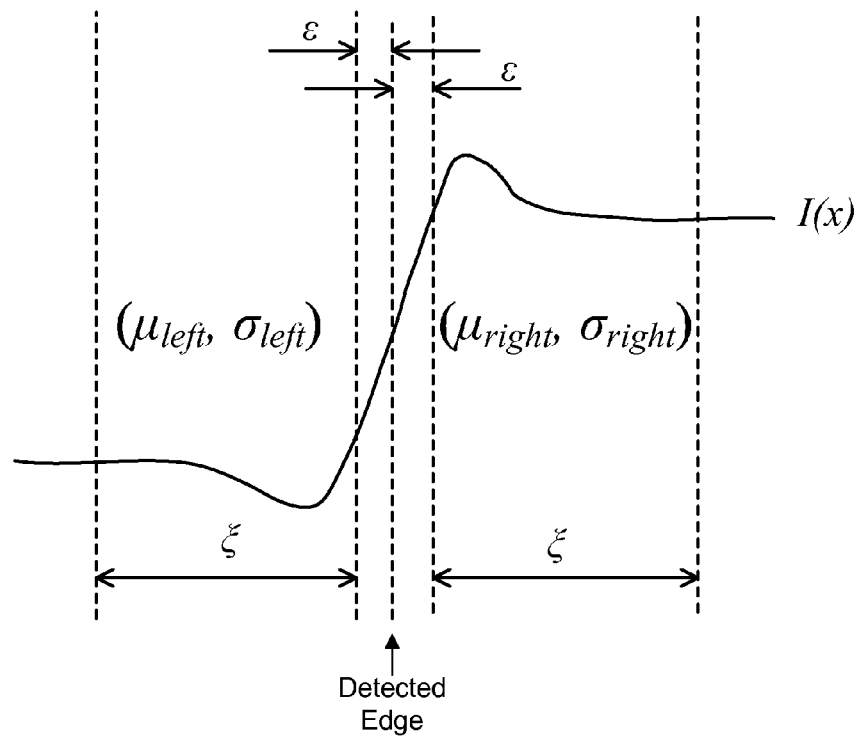
FIG. 8 is a diagram illustrating a 1D intensity profile curve of a detected edge in an image which has been sub-divided into left, middle and right parts.

More particularly, given the 1D intensity profile curve of a detected edge I(x) as shown in FIG. 8, $(\mu_{left}, \sigma_{left})$ and $(\mu_{right}, \sigma_{right})$ are computed. Specifically, the curve is sub-divided into three parts: a left part $[-\xi-\epsilon, -\xi]$; middle part $[-\epsilon, \epsilon]$; and right part $[\epsilon, \xi+\epsilon]$. The location of the edge is set to x=0. The mean and standard deviation of I(x) in the left part are $\mu_{left}$ and $\sigma_{left}$, respectively. $\mu_{right}$ and $\sigma_{right}$ are similarly defined for the right part of I(x).

It is noted that in tested embodiments of the present technique the inner offset parameter $\epsilon$ was set to 2 pixels and the outer parameter $\xi$ was set at 9 pixels. Other inner and outer parameters could also be employed depending on the intensity profile of edges in the image and the resolution of the image being processed.

Once the left and right means and standard deviations are computed, a penalty is established. In one embodiment of the present technique, the penalty is defined as $E_{ring}=(\sigma_{left}+\sigma_{right})/|\mu_{left}-\mu_{right}|$. It is desired to maximize the difference between the left and right parts of the signal while minimizing their variances. The former ensures no oversmoothing occurs, while the latter acts to suppress signal variation due to ringing. The optimal values of $\lambda$ and $\sigma$ are estimated in Eq. (3) by minimizing the sum of the penalties over all the edge points and over all three color channels. In one embodiment of the present technique, the Nelder-Mead simplex algorithm is used for the parameter estimation.

2.2.1.4 Un-Sharpening the Image

Figure 9A:
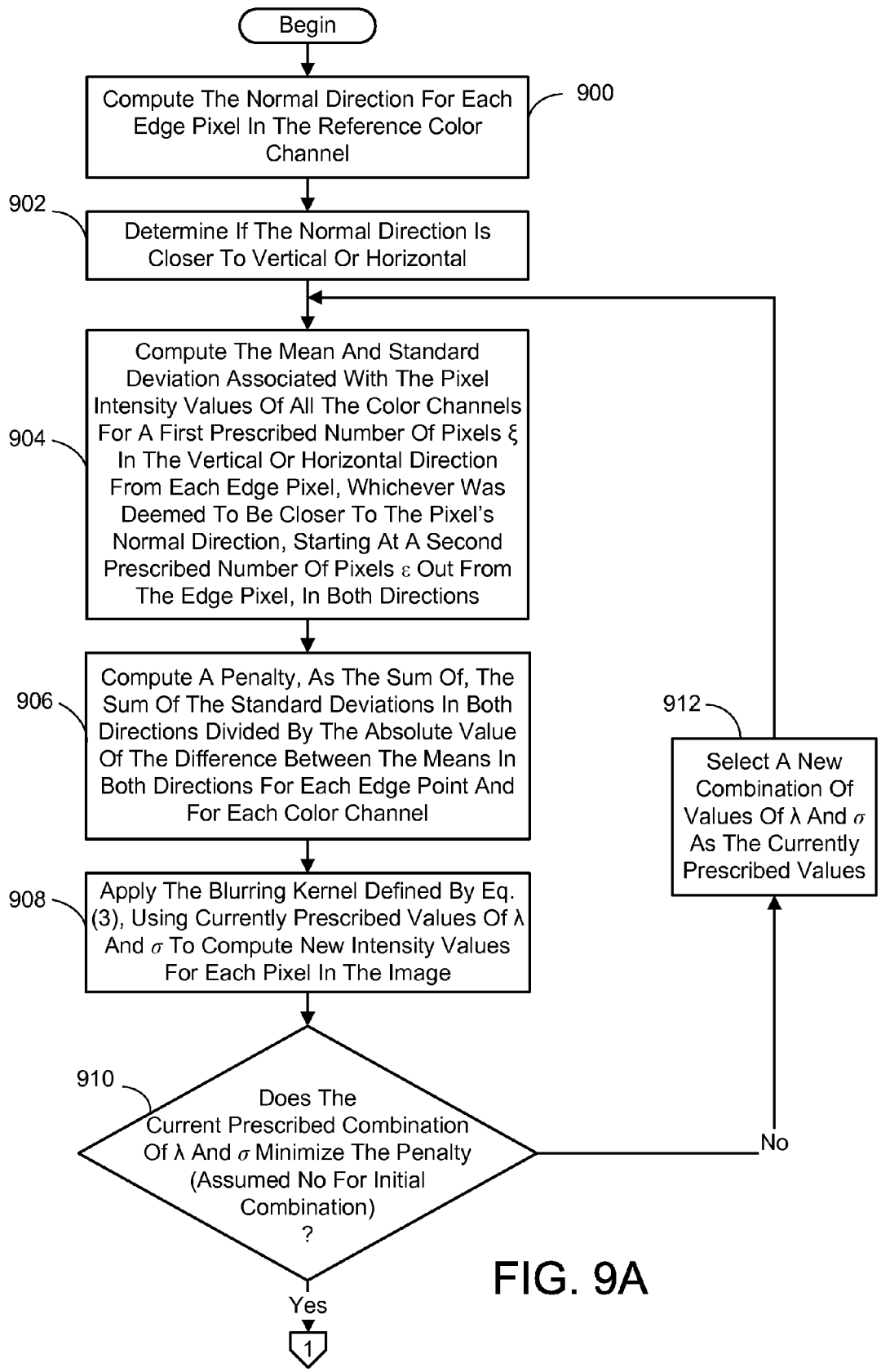
FIGS. 9A-B are a continuing flow diagram generally outlining one embodiment of a process for substantially reversing the effects of in-camera sharpening.
Figure 9B:
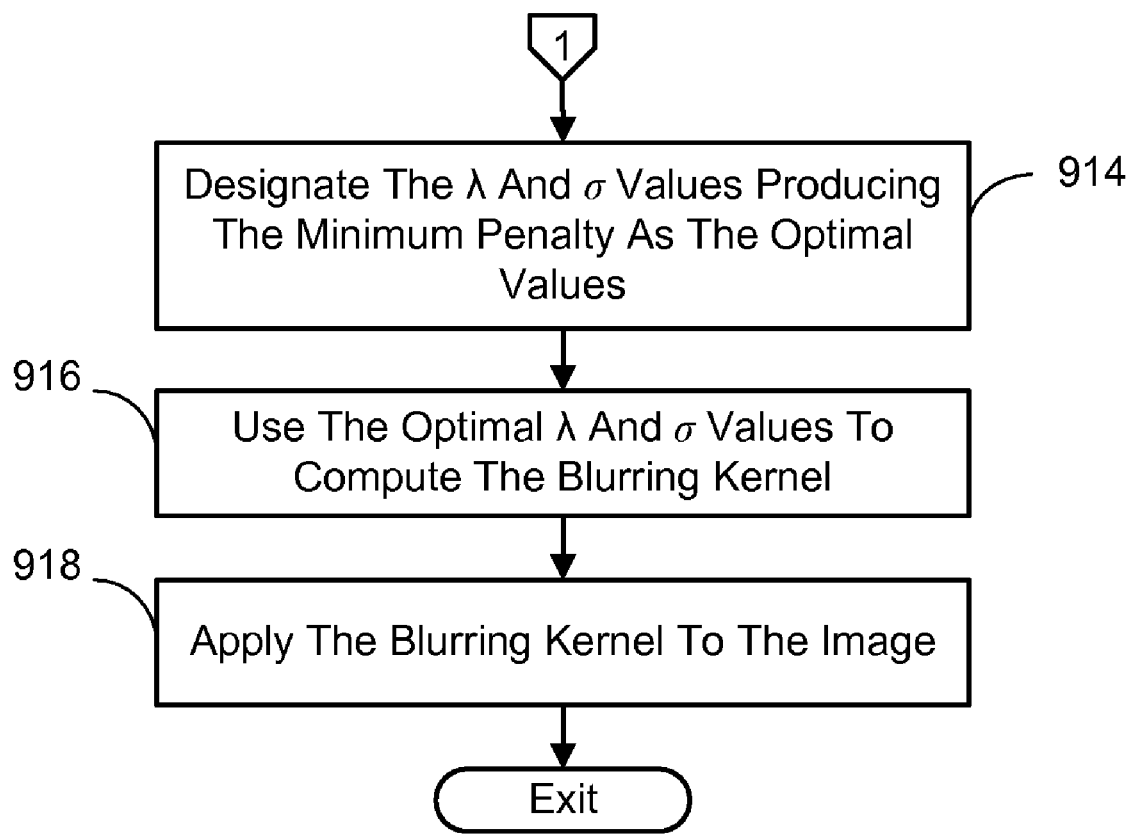

Given the foregoing, in one embodiment of the present technique, substantially reversing the effects of the in-camera sharpening (i.e., un-sharpening the image), involves first computing the normal direction for each edge pixel in the reference color channel (900), as shown in the process flow diagram of FIGS. 9A-B. As indicated above, this can be accomplished using local gradients. It is then determined if the normal direction is closer to vertical or horizontal for each edge pixel in the reference color channel (902). The mean and standard deviation associated with the pixel intensity values of all the color channels for a first prescribed number of pixels $\xi$ in the vertical or horizontal direction from each edge pixel, whichever was deemed to be closer to the pixel's normal direction, starting at a second prescribed number of pixels $\epsilon$ out from the edge pixel, is computed in both directions (904). This results in a separate mean and standard deviation being computed for each direction from each edge pixel, and for each color channel. Next, the penalty is computed by computing the sum of the standard deviations in both directions divided by the absolute value of the difference between the means in both directions, for each edge point and for each color channel, and then summing the results (906). New intensity values are computed for each pixel in the image by applying the aforementioned blurring kernel $H_{Sharp}^{-1}$ as defined by Eq. (3), using currently prescribed values of $\lambda$ and $\sigma$ (908). It is then determine whether the currently prescribed combination of $\lambda$ and $\sigma$ minimizes the penalty (910). However, if the currently prescribed values are the initial values, it is assumed the penalty is not yet minimized. A new combination of values of $\lambda$ and $\sigma$ is selected as the currently prescribed values (912), and process actions 904 through 910 are repeated. When it is determined the penalty is minimized, the $\lambda$ and $\sigma$ values producing the minimum penalty are designated as the optimal $\lambda$ and $\sigma$ values (914), and used to compute the blurring kernel (916). The blurring kernel is then applied to the image (918) to produce an image where the effects of the in-camera sharpening are substantially reversed.

2.2.2 Super-Sampling

The pixel sampling analysis assumes the sensor to be a rectangular array of rectangular sensing elements (pixels), and that each pixel has uniform quantum efficiency over its area. In spatial domain, the averaging function is a box:

$$H_{Box}(x, y, w_x, w_y) = Rect_2\left(\frac{x}{w_x}, \frac{y}{w_y}\right), \quad (4)$$

where $w_x$ and $w_y$ are the pixel length and width, respectively, and $Rect_2(\ )$ is the 2D rectangular function. Suppose the pixel spacings are $d_x$ and $d_y$ along the x- and y-directions, respectively, with $(\phi_x,\phi_y)$ being the phase shift of the grid relative to the optic center. The sampling function is then $$H_{sample}(x, y, d_x, d_y, \phi_x, \phi_y) = \frac{1}{d_x d_y} Shah_2\left(\frac{1}{d_x}(x-\phi_x), \frac{1}{d_y}(y-\phi_y)\right), \quad (5)$$

where $Shah_2(\ )$ is the 2D Shah function (also known as the sampling or replicating function).

If $M_s$ is the continuous image formed on the image plane, its discrete version $M_d$ is $$M_d = (M_s * H_{Box}) \cdot H_{Sample} = \Theta(M_s) \quad (6)$$

As will be seen later, this process needs to be inverted, i.e., approximate a continuous signal $\Phi(X)$ given its discrete counterpart X. However, the pixel sampling process results in a bandlimited signal, which is the best that can be theoretically reconstructed. In one embodiment of the present technique, $\Phi(X)$ is approximated through super-sampling the input resolution of X by a prescribed factor (e.g., 3) and using bicubic interpolation to compute in-between values. This choice of approximation is motivated by speed and memory footprint considerations. As will be described shortly, once the CA has been substantially removed, the image is sampled back to the original input resolution by applying $\Theta$ to the super-sampled image. In the example of the three-times super-sampling, the parameters used in Eqs. (4) and (5) to re-sample the image would be $w_x=w_y=3$, $d_x=d_y=3$, and $\phi_x=\phi_y=0$ (assuming there is no phase shift of the grid relative to the optic center).

2.2.3 Correcting for Chromatic Aberration (CA)

Once the image has been un-sharpened (if required) and super-sampled, the CA can be estimated and substantially removed. This is followed by a re-sampling and re-sharpening (if needed) of the image. The following sub-section describe the optical model associated with CA that was used in deriving the CA correction technique, as well as the CA correction procedure itself.

2.2.3.1 The Optical Model

Chromatic aberration (CA) results in each color channel having its own focal surface being deviated from the ideal flat field. The focal surface is modeled herein as a 3D surface that is radially symmetric, so it is sufficient to recast the lateral and longitudinal shift functions along the radial direction ($d_{Lat}(r)$ and $d_{Long}(r)$, respectively). It is further assumed that the focal surface is smooth. The deviations induced by $d_{Lat}(r)$ and $d_{Long}(r)$ are modeled as radially dependent magnification (convolution kernel $H_{Mag}$) and defocusing (convolution kernel $H_{Defocus}$), respectively, i.e., $H_{CA}=H_{Mag}*H_{Defocus}$. If the incoming light distribution is $M_s$, the light distribution that impinges on the sensor is:

$$M = M_s * H_{CA}. \quad (7)$$

$H_{CA}$ is implemented in two stages:

1. Magnification: The image is warped using the radial function $(x',y')^T=(x,y)^T(a_0+a_1 r(x,y)+a_2 r^2(x,y)+a_3 r^3(x,y))$, where $r(x,y)=\sqrt{x^2+y^2}$ is the radius relative to some center $(c_x,c_y)$. Four parameters $a_0$, $a_1$, $a_2$, and $a_3$ are used to characterize radially-varying magnification.

Figure 10:
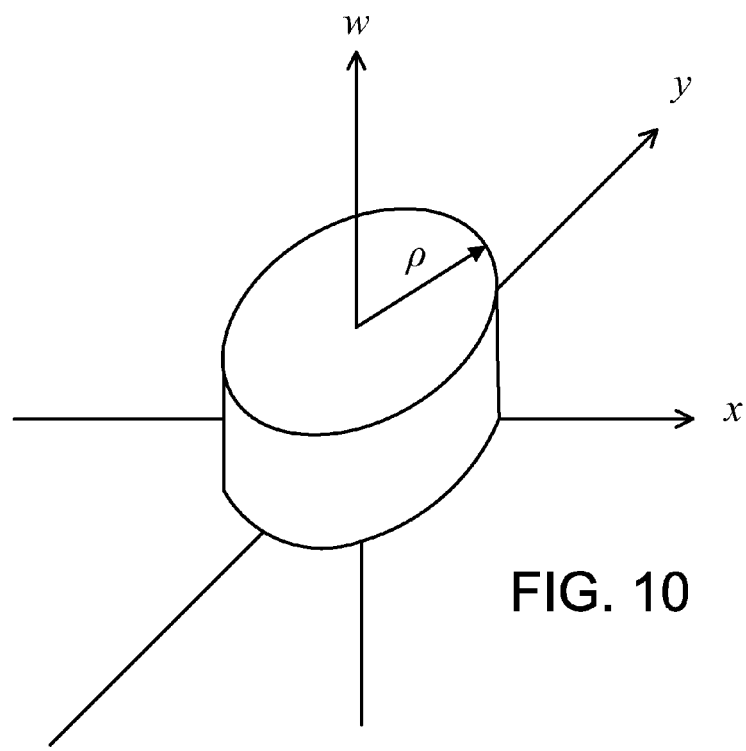
FIG. 10 is a diagram illustrating the modeling of a defocus function in the form of a pillbox, where w is the weight distribution over (x, y), such that their sum over the spatial support (i.e., radius ρ) is normalized to one.

2. Defocus: $H_{Defocus}$ is of the form of a pillbox shown in FIG. 10, where w is the weight distribution over (x, y), such that their sum over the spatial support (i.e., radius ρ) is normalized to one. Thus, $H_{Defocus}$ is characterized using a single parameter ρ that specifies the size of its support. Since the kernel is discrete, weights are computed based on whether the position is wholly inside the pillbox, partially inside, or wholly outside. The radial distribution of ρ is characterized by $\rho(r)=\rho_0+\rho_1 r+\rho_2 r^2$, with r being the distance of the pixel to center $(c_x,c_y)$ (i.e., the same as the magnification center).

Note that because the effect of CA is spatially varying, it is easier to analyze and implement in the spatial domain rather than frequency domain.

For the present technique, the foregoing processes need to be inverted. Fortunately, the magnification stage can be easily inverted. However, without good priors, undoing the defocus effect is impossible if high-frequency components are present. Instead, a sharpening filter is employed to approximate undoing the defocus. While any sharpening filter could be used, such as that modeled by Eq. (1), in tested embodiments a modified sharpening filter was employed. This modified sharpening filter suppresses ringing, which is a characteristic of a typical sharpening operation, by restricting values to within the local minimum and maximum original intensities. In other words, if the sharpened value is below the local minimum, it is replaced with the local minimum; similarly, the local maximum is taken if the sharpened value exceeds it. This operation is called sharpening with halo suppression (SHS).

Figure 11:
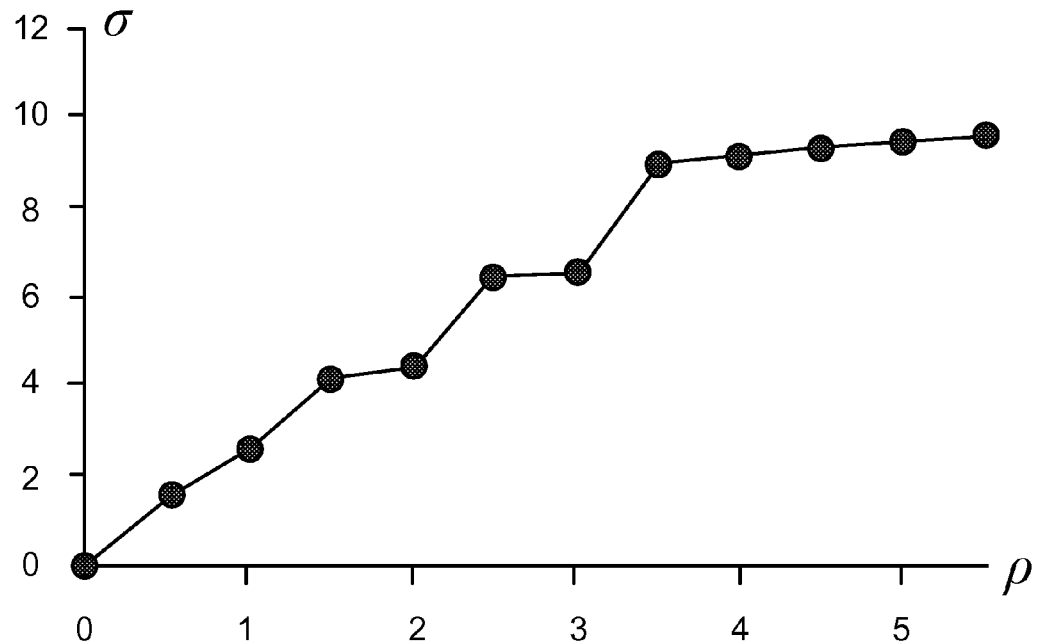
FIG. 11 is a graph plotting the link between the defocus parameter ρ and image sharpening parameter σ.
Figure 12:
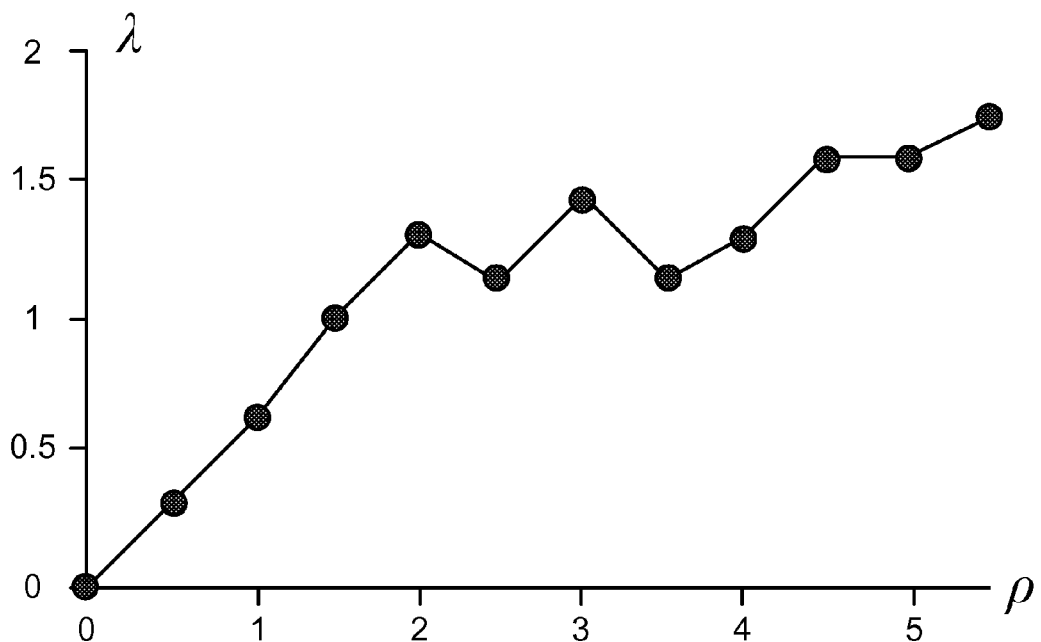
FIG. 12 is a graph plotting the link between the defocus parameter ρ and image sharpening parameter λ.

In order to maintain the same number of degrees of freedom in the forward and inverse process of CA, the defocus parameter ρ is empirically linked with SHS parameters σ and λ. This is done by running simulations of defocusing a checkerboard pattern and minimizing the reconstruction error using the SHS filter. Exemplary graphs illustrating this link are shown in FIGS. 11 and 12.

2.2.3.2 The Correction Procedure

From Eqs. (2), (6), and (7), it can be seen that the discrete output color channels are related to their respective continuous inputs by:

$$R_I=\Theta(R_s*H_{CA,R})*H_{Sharp}$$

$$G_I=\Theta(G_s*H_{CA,G})*H_{Sharp}$$

$$B_I=\Theta(B_s*H_{CA,B})*H_{Sharp}, \quad (8)$$

Suppose the in-camera sharpening can be reasonably undone and the continuous (bandlimited) signal Φ(X) can be approximated from its discrete counterpart X. Then:

$$\Phi(R_I*H_{Sharp}^{-1})=R_s*H_{CA,R}$$

$$\Phi(G_I*H_{Sharp}^{-1})=G_s*H_{CA,G}$$

$$\Phi(B_I*H_{Sharp}^{-1})=B_s*H_{CA,B}, \quad (9)$$

Unfortunately, unless the exact scene color distribution is known, there is ambiguity of $R_s$, $G_s$, $B_s$ up to some radial functions of magnification and defocusing. There is also an ambiguity associated with $H_{Sharp}^{-1}$, thus it is estimated from the image independently of CA using the technique described previously (i.e., see section 2.2.1.3). Since the effect of CA is to be minimized, one of the color channels can be set as the reference and assumed to have a flat field. As mentioned previously, in one embodiment of the present technique green was chosen as the reference.

With the use of the green channel as the flat field reference:

$$\Phi(R_I*H_{Sharp}^{-1})*H_{CA,RG}^{-1}=R_s'$$

$$\Phi(G_I*H_{Sharp}^{-1})=G_s'$$

$$\Phi(B_I*H_{Sharp}^{-1})*H_{CA,BG}^{-1}=B_s', \quad (10)$$

with $G_s'=G_s*H_{CA,G}$, $R_s'=R_s*H_{CA,G}$, $B_s'=B_s*H_{CA,G}$, $H_{CA,RG}=H_{CA,G}^{-1}*H_{CA,R}$ and $H_{CA,BG}=H_{CA,G}^{-1}*H_{CA,B}$.

Given $H_{Sharp}^{-1}$ and the constraint that $R_s'=G_s'=B_s'$ in regions where similarly strong edges exist in all three color bands, $H_{CA,RG}^{-1}$ and $H_{CA,BG}^{-1}$ can be approximated by minimizing:

$$\|\Phi(R_I*H_{Sharp}^{-1})*H_{CA,RG}^{-1}-\Phi(G_I*H_{Sharp}^{-1})\|_E^2 \quad (11)$$

and $$\|\Phi(B_I*H_{Sharp}^{-1})*H_{CA,BG}^{-1}-\Phi(G_I*H_{Sharp}^{-1})\|_E^2 \quad (12)$$

respectively. The subscript E in $\|\cdot\|_E$ is used to indicate computation over the edge regions, which includes edge pixels and pixels in the vicinity of the edge pixels. It is also noted that before running the optimization for $B_I$, the global intensity scale and bias of $G_I$ relative to $B_I$ is compensated for over the edge regions, as it is not desirable to modify $B_I$, because that would modify its CA characteristics. The compensation process is repeated for $R_I$.

Since $H_{Sharp}^{-1}$ is known, Eqs. (11) and (12) can be rewritten as:

$$\|\Phi(R_I')*H_{CA,BG}^{-1}-\Phi(G_I')\|_E^2 \quad (13)$$

and $$\|\Phi(B_I')*H_{CA,BG}^{-1}-\Phi(G_I')\|_E^2 \quad (14)$$

respectively, with $R_I'=R_I*H_{Sharp}^{-1}$, $G_I'=G_I*H_{Sharp}^{-1}$ and $B_I'=B_I*H_{Sharp}^{-1}$.

Recall that $R_I$, $G_I$, $B_I$ are the input discrete image color distributions and that an optimal transformation for $R_I$ and $B_I$ is desired to minimize the effects of CA. Note that for each non-reference color channel (R, B), the number of unknowns to be computed is nine (four to characterize radially-varying magnification, two for the radial center, and three to characterize radially-varying defocus). $H_{CA,RG}$ is considered to produce an effective CA with a single magnification function and a single defocus function. It has nine parameters as stated previously—namely a center $c_{RG}$ (two parameters), magnification $a_{RG}$ (four parameters), and defocus $\rho_{RG}$ (three parameters). Letting $H_{Mag,RG}$ and $H_{Defocus,RG}$ be operations representing magnification and defocus, respectively, $H_{CA,RG}$ can be defined as, $$H_{CA,RG}=H_{Mag,RG}(a_{RG},c_{RG})*H_{Defocus,RG}(\rho_{RG},c_{RG}) \quad (15)$$

Hence, $$H_{CA,RG}^{-1}=H_{Defocus,RG}^{-1}(\rho_{RG},c_{RG})*H_{Mag,RG}^{-1}(a_{RG},c_{RG}), \quad (16)$$

or, $$H_{CA,RG}^{-1}\approx H_{SHS,RG}(\rho_{RG},c_{RG})*H_{Mag,RG}(a_{RG}',c_{RG}) \quad (17)$$

where $a_{RG}'$ is the set of parameters associated with the inverse magnification for $a_{RG}$, while $H_{SHS,RG}(\rho_{RG},c_{RG})$ is the radially-varying sharpening operation with optional halo suppression. As stated previously, in order to maintain the same number of degrees of freedom in the forward and inverse process of CA, the defocus parameter ρ is empirically linked with sharpening parameters σ and λ. At a given radius position r and a hypothesized value of the defocus parameter ρ, it is possible to find the sharpening parameters σ and λ to evaluate $H_{SHS,RG}$ ($\rho_{RG}$,$c_{RG}$) at r. The CA removal operation for the blue color channel $H_{CA,BG}^{-1}$ is similarly defined and computed.

Figure 13A:
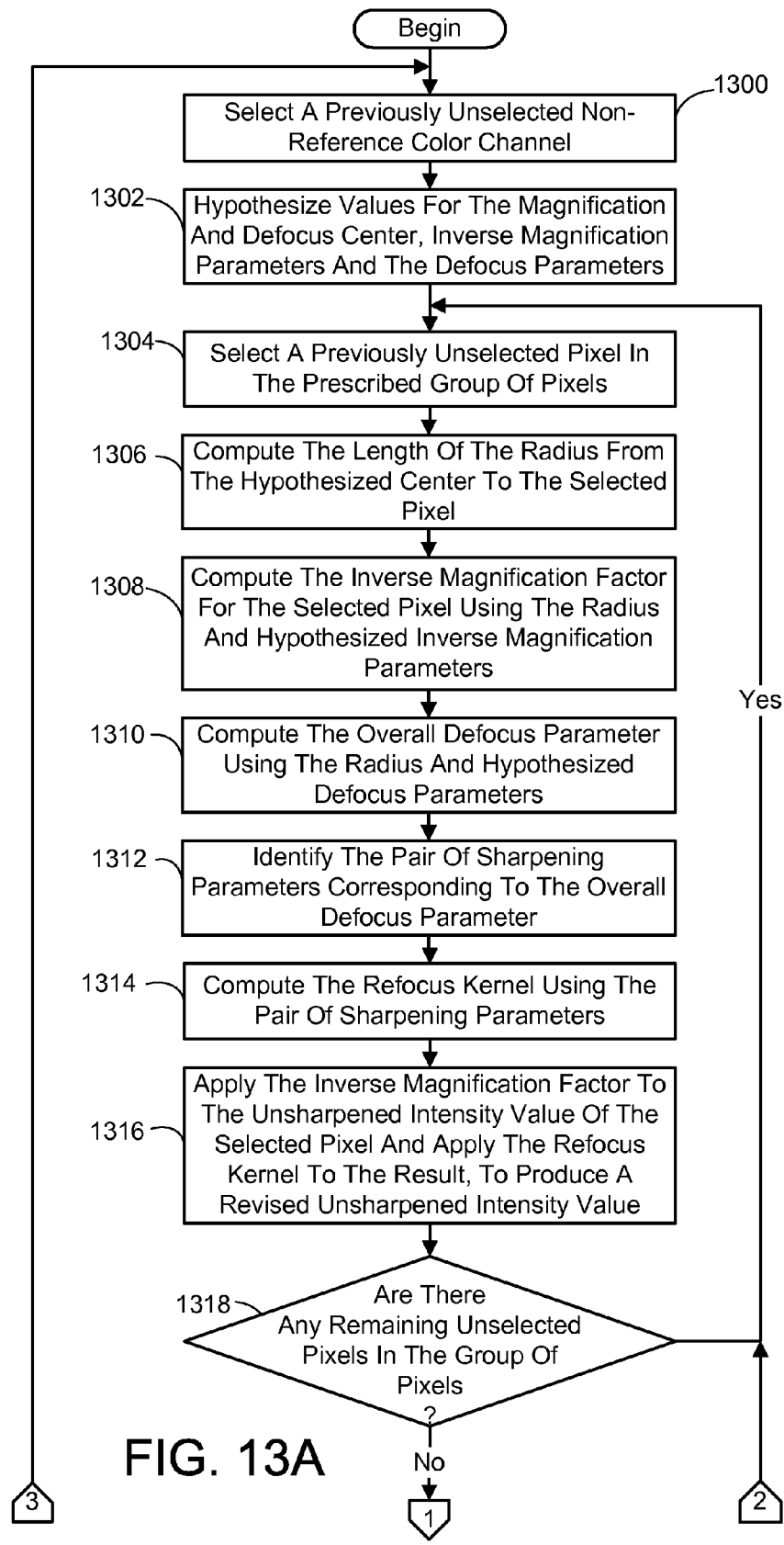
FIGS. 13A-B are a continuing flow diagram generally outlining one embodiment of a process for establishing CA removal operations for each of the non-reference color channels.
Figure 13B:
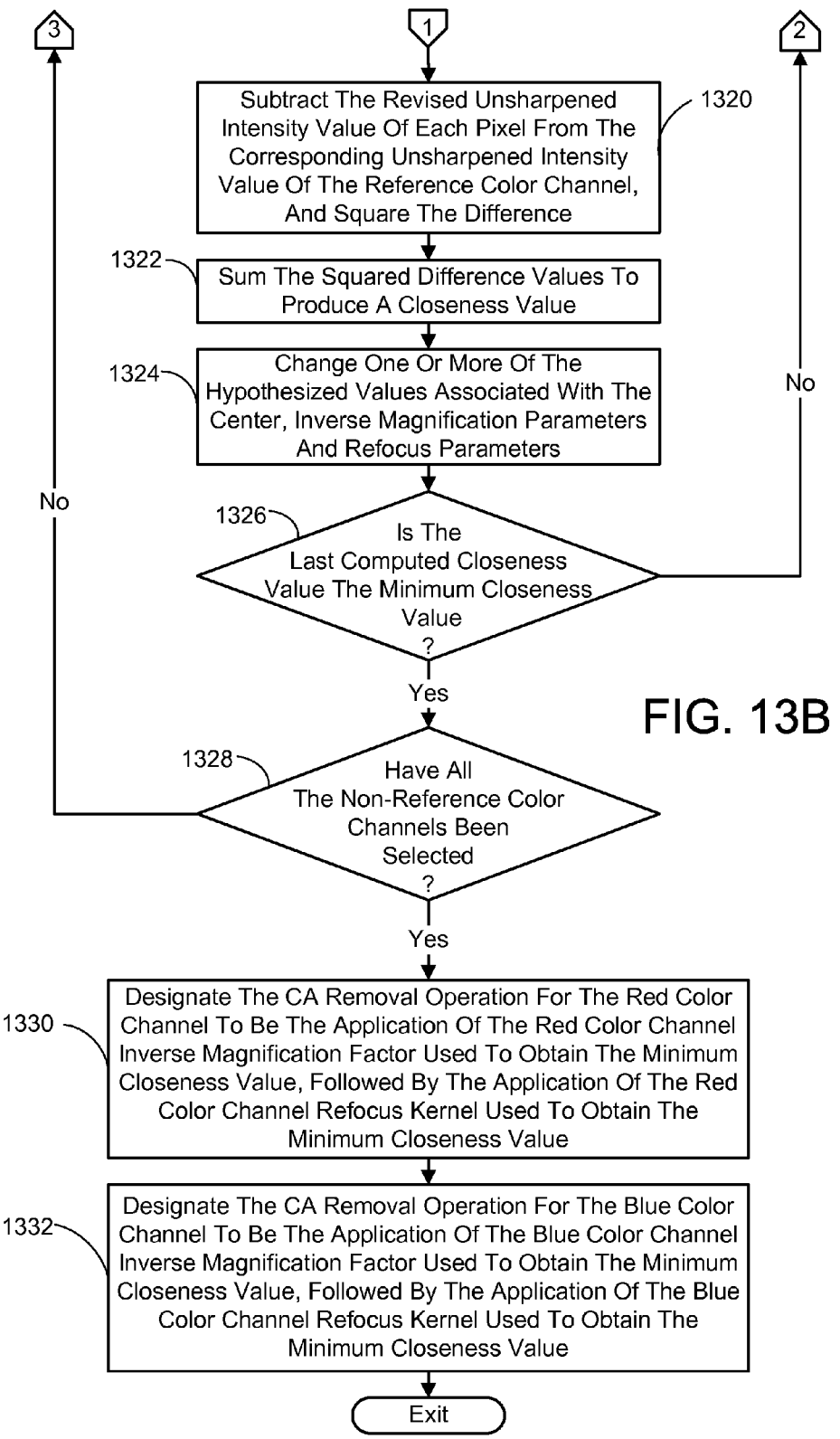

In one embodiment of the present CA correction technique, the foregoing CA removal operations $H_{CA,BG}^{-1}$, $H_{CA,BG}^{-1}$ for the non-reference color channels (R and B, respectively) are established as shown in FIGS. 13A-B. First, one of the non-reference color channels is selected (1300). Location values for the magnification and defocus center ($c_x$,$c_y$) are then hypothesized for the selected color channel, as are values for the inverse magnification parameters ($a_0$, $a_1$, $a_2$, $a_3$) and the defocus parameters ($\rho_0$, $\rho_1$, $\rho_2$) (1302). Next, a previously unselected pixel in a prescribed group of pixels is selected (1304). As indicated previously, this group of pixels includes edge pixels and pixels in the vicinity of the edge pixels. In one implementation, all the edge pixels and every pixel within a prescribed distance of an edge pixel (e.g., 2 pixels distance) is included in the group. In another implementation, only some of the edge pixels and the other pixels within the prescribed distance of these edge pixels are included in the group. For instance, only strong edge pixel might be considered. This second implementation reduces the amount of processing required.

The length of a radius from the hypothesized center to the selected pixel is then computed (1306). This radius used to compute an inverse magnification factor for the selected pixel using the hypothesized inverse magnification parameters as $a_0'+a_1'r+a_2'r^2+a_3'r^3$ (1308). In addition, an overall defocus parameter is computed using the radius and the hypothesized defocus parameters as $\rho_c+\rho_1 r+\rho_2 r^2$ (1310). The overall defocus parameter is then used to identify a pair of sharpening parameters σ and λ using the pre-computed, empirically derived correspondence relationships described previously (1312). A refocus kernel is computed using the identified pair of sharpening parameters as $H_1+\lambda(H_1-H_\sigma)$, where, as described previously, $H_1$ is a kernel with one at the center and zero everywhere else, $H_\sigma$ is a Gaussian blur kernel with parameter σ, and λ is the amount of high-frequency contribution (1314).

Next, the inverse magnification factor is applied to the unsharpened intensity value of the selected pixel and the refocus kernel is applied to the result, to produce a revised unsharpened intensity value for the pixel (1316). It is then determined if there are any remaining pixels in the aforementioned group of pixels that have not been selected (1318). If so, then actions 1304 through 1318 are repeated. When all the pixels in the group have been selected and processed, the now revised unsharpened intensity value of each of these pixels is respectively subtracted from the corresponding unsharpened intensity value of the reference color channel, and the difference is squared (1320). The squared difference values are then summed to produce a closeness value (1322). This closeness value indicates how close the revised unsharpened intensity values are to the unsharpened intensity values associated with the reference color channel.

One or more of the hypothesized values for the magnification and defocus center, inverse magnification parameters and refocus parameters is then changed (1324), and actions 1304 through 1324 are repeated until it is deemed that one of the computed closeness values represents the minimum closeness value (1326). It is then determined if all the non-reference color channels have been selected and processed (1328). If not, actions 1302 through 1326 are repeated. Otherwise, the CA removal operation $H_{CA,RG}^{-1}$ for substantially removing the effects of CA with regard to the red color channel is designated as the application of the inverse magnification factor employed to obtain the minimum closeness value associated with the red non-reference color channel, followed by the application of the refocus kernel employed to obtain the minimum closeness value associated with this color channel (1330). Similarly, the CA removal operation $H_{CA,BG}^{-1}$ for substantially removing the effects of CA with regard to the blue color channel is designated as the application of the inverse magnification factor employed to obtain the minimum closeness value associated with the blue non-reference color channel, followed by the application of the refocus kernel employed to obtain the minimum closeness value associated with the blue non-reference color channel (1332).

It is noted that the application of the inverse magnification factor to the unsharpened intensity value of the selected pixel and the subsequent application of the refocus kernel to the result, to produce a revised unsharpened intensity value for the pixel (see action 1316), can be reversed. In other words, this action would instead entail applying the refocus kernel to the unsharpened intensity value of the selected pixel first, and then applying the inverse magnification factor to the result. The outcome of this reversal would be that different hypothesized values for the magnification and defocus center, inverse magnification parameters and refocus parameters would be found to minimize the closeness value for each of the non-reference color channels. Given this, if the reversed application implementation is employed, the CA removal operation $H_{CA,RG}^{-1}$ would be designated as the application of the refocus kernel employed to obtain the minimum closeness value associated with the red non-reference color channel, followed by the application of the inverse magnification factor employed to obtain the minimum closeness value associated with the red color channel. Similarly, the CA removal operation $H_{CA,BG}^{-1}$ would be designated as the application of the refocus kernel employed to obtain the minimum closeness value associated with the blue non-reference color channel, followed by the application of the inverse magnification factor employed to obtain the minimum closeness value associated with the blue channel.

It is further noted that in the case where the image being corrected was not sharpened, the foregoing procedures would be the same except that no initial unsharpening operation would be performed and so the inverse magnification factor or refocus kernel (as the case may be) would be applied the original pixel intensities of the image for the color channel under consideration to produce a revised intensity value for each pixel considered.

Figure 14:
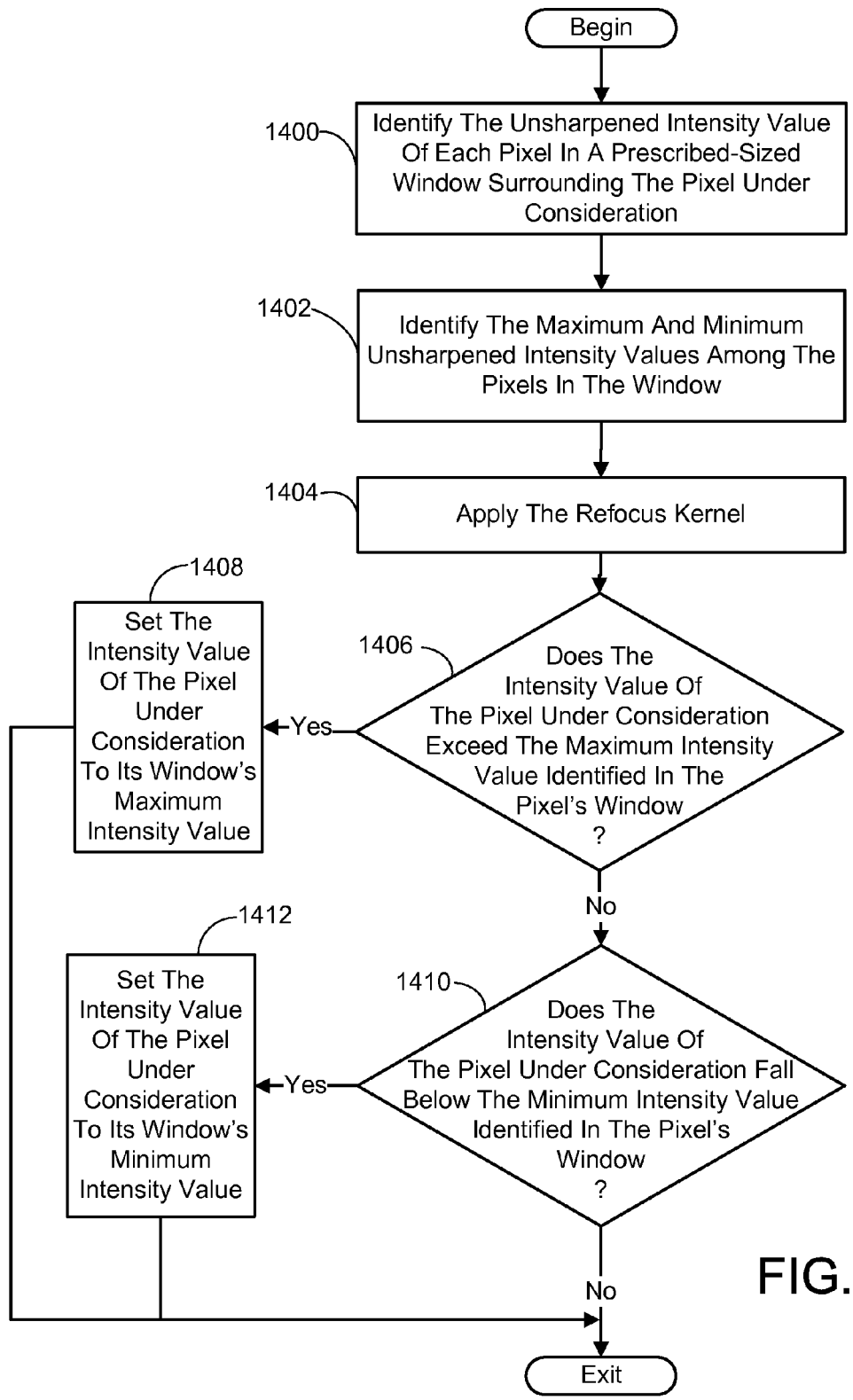
FIG. 14 is a flow diagram generally outlining one embodiment of a process for applying the refocus kernel to a pixel using a sharpening with halo suppression (SHS) operation.

In regard to the application of the refocus kernel to a pixel in the foregoing procedures, in one embodiment of the present technique this simply involves applying the kernel in a normal manner using the previously-described width of (2⌈3σ⌉+1). However in the aforementioned embodiment involving the use of the sharpening with halo suppression (SHS) operation, the application process expanded as shown in FIG. 14. First, the unsharpened intensity value of each pixel (assuming the image being corrected was sharpened and underwent an unsharpening operation) in a prescribed-sized window surrounding the pixel under consideration is identified (1400), as is the maximum and minimum unsharpened intensity values among the pixels in this window (1402). Then, the refocus kernel is applied in the normal manner to the pixel under consideration using a width of (2⌈3σ⌉+1) (1404). It is next determined if the resulting intensity value of the pixel under consideration exceeds the maximum intensity value identified in the window associated with that pixel (1406). If so, the intensity value of the pixel under consideration is set to match the maximum intensity value identified in the window associated with the pixel (1408). If not, it is determined if the intensity value of the pixel under consideration is less than the minimum intensity value identified in the window associated with that pixel (1410). If it is, the intensity value of the pixel under consideration is set to match the minimum intensity value identified in the window associated with the pixel (1412). Otherwise the intensity value is not changed and the application procedure ends.

In tested embodiments of the present technique, the Nelder-Mead simplex method was used to optimize Eqs. (13) and (14), where a reasonable set of starting points was specified. However, other optimization methods could be employed to optimize Eqs. (13) and (14), as desired with one caveat. It was found that the Levenberg-Marquardt (L-M) method did not work well. It is believed that the increments used to estimate local gradients were too small to make a measurable change in the objective functions, and L-M stalled in many occasions.

Once $H_{CA,RG}^{-1}$ and $H_{CA,BG}^{-1}$ are computed, the desired transformed $R_I$ and $B_I$ over the entire image are given by:

$$R_I''=\Theta(\Phi(R_I')*H_{CA,RG}^{-1})*H_{Sharp} \quad (18)$$

and $$B_I''=\Theta(\Phi(B_I')*H_{CA,BG}^{-1})*H_{Sharp}. \quad (19)$$

Note that the CA corrected image is sampled back to the original resolution for each non-reference color channel using the sampling function $\Theta$, and sharpened using $H_{sharp}$. In regard to the green channel that was used as the reference channel, the original pixel intensity values could be used as it is assumed that only negligible CA is present. However, even though the green channel is the reference channel, it may still contain ringing effects. Most of such occurrences of this ringing can be substantially removed by replacing the original $G_I$ values with $(G_I*H_{Sharp}^{-1})*H_{Sharp}$, where $H_{sharp}$ is implemented as sharpening with halo suppression (SHS). In other words, the SHS version of the shapening filter $H_{Sharp}$ would be applied to the un-sharpened green channel intensity values to produce the final green channel values $G_I''$.

Of course, if there is no in-camera sharpening, the $H_{sharp}$ and $H_{Sharp}^{-1}$ terms are deleted from Eqs. (8) through (16). Thus, Eqs. (18) and (19) reduce to $R_I''=\Theta(\Phi(R_I)*H_{CA,RG}^{-1})$ and $B_I''=\Theta(\Phi(B_I)*H_{CA,BG}^{-1})$, respectively. In addition the original $G_I$ intensity values are used as the final values.

3.0 Other Embodiments

It should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for reducing the effects of chromatic aberration (CA) in a digital color image captured without in-camera sharpening, comprising using a computer to perform the following process actions:

identifying edge pixels in the image at locations where there is a readily identifiable, substantially co-located edge in each color channel, along with pixels within a prescribed distance of the edge pixels;
super-sampling the image by a prescribed factor;
designating one of the color channels as a reference channel;
for each non-reference color channel,
    establishing an objective function representing a difference between the intensity of an identified pixel with regard to the reference color channel and the intensity of the pixel with regard to the non-reference color channel under consideration, after applying a CA removal function to the non-reference color channel pixel that substantially removes the effects of CA, wherein said CA removal function comprises a number of unknown CA parameters associated with the CA effect,
    computing a set of CA parameters that minimizes the objective function across all the identified pixels, and
    employing the set of CA parameters in the CA removal function to compute a new intensity value for each pixel in the image for the non-reference color channel under consideration; and
sampling the image to return it to its original resolution.

2. The process of claim 1, wherein the color channels comprise red, green and blue color channels, and wherein the green color channel is selected as the reference channel.

3. The process of claim 1, wherein the process action of super-sampling the image, comprises an action of employing bicubic interpolation to compute the intensity values of new pixels formed in-between the original pixels of the image.

4. The process of claim 3, wherein the prescribed super-sampling factor is three.

5. The process of claim 3, wherein the process action of sampling the image to return it to its original resolution, comprises an action of sampling the image using the same functions the camera uses to sample images.

6. The process of claim 1, wherein the process action of identifying edge pixels in the image, comprises the actions of:
applying independently to each of the color channels of the image pixels, a difference-of-Gaussian (DoG) filter to smooth the intensity values thereof;
for each color channel,
    identifying edge pixels using an edge detection technique that employs a high enough edge strength threshold to ensure only readily detectable edge pixels are identified for the color channel under consideration,
    eliminating from consideration identified edge pixels not having 4-connected neighboring pixels that are also identified as edge pixels,
    eliminating from consideration identified edge pixels not having edge pixels associated with each of the other color channels within a prescribed distance from the edge pixel under consideration,
    designating the remaining non-eliminated edge pixels as the edge pixels associated with the color channel under consideration.

7. The process of claim 1, wherein the color channels comprise red, green and blue color channels, and wherein the green color channel is selected as the reference channel, and wherein the process action of establishing an objective function for each non-reference color channel, comprises the actions of:
establishing the objective function for the red color channel as $\|\Phi(R_I)*H_{CA,RG}^{-1}-\Phi(G_I)\|_E^2$, wherein $\Phi(R_I)$ is the red color channel intensity observed in the super-sampled image, $\Phi(G_I)$ is the green color channel intensity observed in the super-sampled image, $H_{CA,RG}^{-1}$ is the CA removal function that is established to substantially remove the effects of CA with regard to the red color channel, and the subscript E indicates that the objective function is computed for only the identified pixels, establishing the objective function for the blue color channel as $\|\Phi(B_I)*H_{CA,BG}^- - \Phi(G_I)\|_E^2$, wherein $\Phi(B_I)$ is the blue color channel intensity observed in the super-sampled image, and $H_{CA,BG}^{-1}$ is the CA removal function that is established to substantially remove the effects of CA with regard to the blue color channel.

8. The process of claim 7, wherein the process action of establishing $H_{CA,RG}^{-1}$ and $H_{CA,BG}^{-1}$, comprises the action of: for each non-reference color channel,
   (a) hypothesizing location values for a magnification and defocus center $(c_x, c_y)$,
   (b) hypothesizing values for a set of inverse magnification parameters $(a_0, a_1, a_2, a_3)$,
   (c) hypothesizing values for a set of defocus parameters $(\rho_0, \rho_1, \rho_2)$,
   (d) for each of a prescribed group of pixels comprising at least some edge pixels and pixels within a prescribed distance of the edge pixels,
      (i) computing the length of a radius from the hypothesized center to the pixel under consideration,
      (ii) computing an inverse magnification factor using the hypothesized set of inverse magnification parameters as $a_0' + a_1'r + a_2'r^2 + a_3'r^3$ for the pixel under consideration,
      (iii) computing an overall defocus parameter using the hypothesized set of defocus parameters as $\rho_0 + \rho_1'r + \rho_2'r^2$,
      (iv) identifying a pair of sharpening parameters $\sigma$ and $\lambda$ corresponding to the computed overall defocus parameter using pre-computed, empirically derived correspondence relationships,
      (v) computing a refocus kernel using the identified pair of sharpening parameters as $H_1 + \lambda(H_1 - H_\sigma)$ wherein $H_1$ is a kernel with one at the center and zero everywhere else, $H_\sigma$ is a Gaussian blur kernel with parameter $\sigma$, and $\lambda$ is the amount of high-frequency contribution, and
      (vi) applying the refocus kernel to the intensity value of the pixel under consideration for the non-reference color channel under consideration, and applying the inverse magnification factor to the result to produce a revised intensity value,
   (e) for each pixel having a revised intensity value associated with the color channel under consideration, subtracting the revised intensity value from the intensity value associated with the reference color channel, and squaring the difference,
   (f) summing the squared difference values to produce a closeness value indicating how close the revised intensity values associated with the color channel under consideration are to the intensity values associated with the reference color channel,
   (g) changing one or more of the hypothesized values for the magnification and defocus center, inverse magnification parameters and refocus parameters, and repeating actions (a) through (f), and
   (h) repeating action (g) until one of the computed closeness values is deemed to be the minimum closeness value;

designating the CA removal operation $H_{CA,RG}^{-1}$ for substantially removing the effects of CA with regard to the red color channel to be the application of the refocus kernel employed to obtain the minimum closeness value associated with the red non-reference color channel, followed by the application of the inverse magnification factor employed to obtain the minimum closeness value associated with the red non-reference color channel; and designating the CA removal operation $H_{CA,BG}^{-1}$ for substantially removing the effects of CA with regard to the blue color channel to be the application of the refocus kernel employed to obtain the minimum closeness value associated with the blue non-reference color channel, followed by the application of the inverse magnification factor employed to obtain the minimum closeness value associated with the blue non-reference color channel.

9. The process of claim 8, wherein the process actions of applying the refocus kernel, comprises the actions of, for each pixel under consideration:
   identifying the intensity value of each pixel in a prescribed-sized window surrounding the pixel under consideration;
   identifying the maximum and minimum intensity values among the pixels in said window;
   applying the refocus kernel to the pixel under consideration using a width of $(2\lceil 3\sigma \rceil + 1)$;
   determining if the resulting intensity value of the pixel under consideration exceeds the maximum intensity value identified in the window associated with that pixel;
   determining if the resulting intensity value of the pixel under consideration is less than the minimum intensity value identified in the window associated with that pixel;
   whenever the resulting intensity value of the pixel under consideration exceeds the maximum intensity value identified in the window associated with that pixel, setting the intensity value of the pixel under consideration to match the maximum intensity value identified in the window associated with the pixel; and
   whenever the resulting intensity value of the pixel under consideration is less than the minimum intensity value identified in the window associated with that pixel, setting the intensity value of the pixel under consideration to match the minimum intensity value identified in the window associated with the pixel.

10. The process of claim 7, wherein the process actions of employing the set of CA parameters in the CA removal function to compute a new intensity value for each pixel in the image for the non-reference color channel under consideration and sampling the image, comprises the actions of:
   computing for each pixel in the image for the red color channel $R_I'' = \Theta(\Phi(R_I)*H_{CA,RG}^{-1})$ wherein $R_I''$ is an intensity value for a pixel under consideration that has had the effects of CA substantially removed and $\Theta$ is a sampling function that reverses the supersampling; and
   computing for each pixel in the image for the blue color channel $B_I'' = \Theta(\Phi(B_I)*H_{CA,BG}^{-1}$ wherein $B_I''$ is an intensity value for a pixel under consideration that has had the effects of CA substantially removed.

11. A computer-implemented process for reducing the effects of chromatic aberration (CA) in a digital color image captured with in-camera sharpening, comprising using a computer to perform the following process actions:
   identifying edge pixels in the image at locations where there is a readily identifiable, substantially co-located edge in each color channel, along with pixels within a prescribed distance of the edge pixels;

substantially reversing the effects of the in-camera sharpening applied to the image by applying a blurring kernel to the pixels of the image to produce unsharpened intensity values;

super-sampling the image by a prescribed factor;

designating one of the color channels as a reference channel;

for each non-reference color channel, establishing an objective function representing a difference between the unsharpened intensity of an identified pixel with regard to the reference color channel and the unsharpened intensity of the pixel with regard to the non-reference color channel under consideration, after applying a CA removal function to the non-reference color channel pixel that substantially removes the effects of CA, wherein said CA removal function comprises a number of unknown CA parameters associated with the CA effect, computing a set of CA parameters that minimizes the objective function across all the identified pixels, and employing the set of CA parameters in the CA removal function to compute a new intensity value for each pixel in the image for the non-reference color channel under consideration;

sampling the image to return it to its original resolution; and applying a sharpening filter to substantially undo the effects of the previously applied blurring kernel.

12. The process of claim 11, wherein the process action for substantially reversing the effects of the in-camera sharpening for each pixel of the image, comprises the actions of:

(a) computing the normal direction for each edge pixel in the reference color channel using local gradients;

(b) for each edge pixel in the reference color channel, determining if the normal direction is closer to vertical or horizontal;

(c) computing the mean and standard deviation associated with the pixel intensity values for a first prescribed number of pixels in the vertical or horizontal direction from the edge pixel, whichever was deemed to be closer to its normal direction, starting at a second prescribed number of pixels out from the edge pixel, in both directions, wherein a separate mean and standard deviation is computed for each direction from the edge pixel and for each color channel;

(d) computing a penalty as the sum of the sum of the standard deviations in both directions divided by the absolute value of the difference between the means in both directions, for each edge point and for each color channel;

(e) computing new intensity values for each pixel in the image by applying the blurring kernel $H_{Sharp}^{-1}$ defined as $H_1 - \lambda(H_1 - H_o) + \lambda^2(H_1 - H_o)^2$, wherein $H_1$ is a kernel with one at the center and zero everywhere else, $H_o$ is a Gaussian blur kernel with parameter $\sigma$, and $\lambda$ is the amount of high-frequency contribution, and wherein the current values of $\lambda$ and $\sigma$ are prescribed;

(f) repeating (c) and (e) using different combinations of values of $\lambda$ and $\sigma$ as the current values until the penalty is minimized;

(g) designating the values of $\lambda$ and $\sigma$ producing the minimum penalty as the optimal $\lambda$ and $\sigma$, and computing the blurring kernel using these values;

(h) applying the blurring kernel to the image to produce an image wherein the effects of the in-camera sharpening are substantially reversed.

13. The process of claim 12, wherein the process action of applying the blurring kernel to the image, comprises applying the blurring kernel using a width of $(2\lceil 3\sigma \rceil + 1)$.

14. The process of claim 11, wherein the color channels comprise red, green and blue color channels, and wherein the green color channel is selected as the reference channel, and wherein the process action of establishing an objective function for each non-reference color channel, comprises the actions of:

establishing the objective function for the red color channel as $\|\Phi(R_I')*H_{CA,RG}^{-1} - \Phi(G_I')\|_E^2$, wherein $\Phi(R_I')$ is the unsharpened red color channel intensity observed in the super-sampled image, $\Phi(G_I')$ is the unsharpened green color channel intensity observed in the super-sampled image, $H_{CA,RG}^{-1}$ is the CA removal operation that is established to substantially remove the effects of CA with regard to the red color channel, and the subscript E indicates that the objective function is computed for only the identified pixels;

establishing the objective function for the blue color channel as $\|\Phi(B_I')*H_{CA,BG}^{-1} - \Phi(G_I')\|_E^2$, wherein $\Phi(B_I')$ is the unsharpened blue color channel intensity observed in the super-sampled image, and $H_{CA,BG}^{-1}$ is the CA removal operation that is established to substantially remove the effects of CA with regard to the blue color channel.

15. The process of claim 14, wherein the process action of establishing $H_{CA,RG}^{-1}$ and $H_{CA,BG}^{-1}$, comprises the action of:

for each non-reference color channel, (a) hypothesizing location values for a magnification and defocus center $(c_x, c_y)$, (b) hypothesizing values for a set of inverse magnification parameters $(a_0, a_1, a_2, a_3)$, (c) hypothesizing values for a set of defocus parameters $(\rho_0, \rho_1, \rho_2)$, (d) for each of a prescribed group of pixels comprising at least some edge pixels and pixels within a prescribed distance of the edge pixels, (i) computing the length of a radius from the hypothesized center to the pixel under consideration, (ii) computing an inverse magnification factor using the hypothesized set of inverse magnification parameters as $a_0' + a_1'r + a_2'r^2 + a_3'r^3$ for the pixel under consideration, (iii) computing an overall defocus parameter using the hypothesized set of defocus parameters as $\rho_0 + \rho_1 r + \rho_2 r^2$, (iv) identifying a pair of sharpening parameters $\sigma$ and $\lambda$ corresponding to the computed overall defocus parameter using pre-computed, empirically derived correspondence relationships, (v) computing a refocus kernel using the identified pair of sharpening parameters as $H_1 + \lambda(H_1 - H_o)$ wherein $H_1$ is a kernel with one at the center and zero everywhere else, $H_o$ is a Gaussian blur kernel with parameter $\sigma$, and $\lambda$ is the amount of high-frequency contribution, and (vi) applying the inverse magnification factor to the unsharpened intensity value of the pixel under consideration for the non-reference color channel under consideration and applying the refocus kernel to the result to produce a revised unsharpened intensity value, (e) for each pixel having a revised unsharpened intensity value associated with the color channel under consideration, subtracting the revised unsharpened intensity value from the unsharpened intensity value associated with the reference color channel, and squaring the difference, (f) summing the squared difference values to produce a closeness value indicating how close the revised unsharpened intensity values associated with the color channel under consideration are to the unsharpened intensity values associated with the reference color channel, (g) changing one or more of the hypothesized values for the magnification and defocus center, inverse magnification parameters and refocus parameters, and repeating actions (a) through (f), and (h) repeating action (g) until one of the computed closeness values is deemed to be the minimum closeness value;

designating the CA removal operation $H_{CA,RG}^{-1}$ for substantially removing the effects of CA with regard to the red color channel to be the application of the inverse magnification factor employed to obtain the minimum closeness value associated with the red non-reference color channel, followed by the application of the refocus kernel employed to obtain the minimum closeness value associated with the red non-reference color channel; and designating the CA removal operation $H_{CA,BG}^{-1}$ for substantially removing the effects of CA with regard to the blue color channel to be the application of the inverse magnification factor employed to obtain the minimum closeness value associated with the blue non-reference color channel, followed by the application of the refocus kernel employed to obtain the minimum closeness value associated with the blue non-reference color channel.

16. The process of claim 15, wherein the process actions of applying the refocus kernel, comprises the actions of, for each pixel under consideration:

identifying the unsharpened intensity value of each pixel in a prescribed-sized window surrounding the pixel under consideration;

identifying the maximum and minimum unsharpened intensity values among the pixels in said window;

applying the refocus kernel to the pixel under consideration using a width of $(2\lceil 3\sigma \rceil +1)$;

determining if the resulting intensity value of the pixel under consideration exceeds the maximum intensity value identified in the window associated with that pixel;

determining if the resulting intensity value of the pixel under consideration is less than the minimum intensity value identified in the window associated with that pixel;

whenever the resulting intensity value of the pixel under consideration exceeds the maximum intensity value identified in the window associated with that pixel, setting the intensity value of the pixel under consideration to match the maximum intensity value identified in the window associated with the pixel; and whenever the resulting intensity value of the pixel under consideration is less than the minimum intensity value identified in the window associated with that pixel, setting the intensity value of the pixel under consideration to match the minimum intensity value identified in the window associated with the pixel.

17. The process of claim 14, wherein the process actions of employing the set of CA parameters in the CA removal function to compute a new intensity value for each pixel in the image for the non-reference color channel under consideration, sampling the image, and applying the sharpening filter, comprises the actions of:

computing for each pixel in the image for the red color channel $R_I''=\Theta(\Phi(R_I')*H_{CA,RG}^{-1})*H_{Sharp}$, wherein $R_I''$ is an intensity value for a pixel under consideration that has had the effects of CA substantially removed, $\Theta$ is a sampling function that reverses the supersampling, and $H_{Sharp}$ is the sharpening filter used to undo the effects of the previously applied blurring kernel; and computing for each pixel in the image for the blue color channel $B_I''=\Theta(\Phi(B_I')*H_{CA,BG}^{-1})*H_{Sharp}$, wherein $B_I''$ is an intensity value for a pixel under consideration that has had the effects of CA substantially removed.

18. The process of claim 17, wherein the sharpening filter $H_{Sharp}$ is applied using a width of $(2\lceil 3\sigma \rceil +1)$, where a is a prescribed sharpening parameter.

19. The process of claim 11, wherein the prescribed super-sampling factor is three, and wherein the process action of super-sampling the image comprises employing bicubic interpolation to compute the intensity values of new pixels formed in-between the original pixels of the image.

20. A computer-readable medium having computer-executable instructions for performing the process actions recited in claim 11.

* * * * *

UNITED STATES PATENT AND TRADEMARK OFFICE
CERTIFICATE OF CORRECTION

PATENT NO.         : 7,792,357 B2
APPLICATION NO.    : 11/755357
DATED              : September 7, 2010
INVENTOR(S)        : Sing Bing Kang It is certified that error appears in the above-identified patent and that said Letters Patent is hereby corrected as shown below:

In column 17, line 7, in Claim 7, delete "pixels," and insert -- pixels; --, therefor.

In column 17, line 9, in Claim 7, delete "*$H_{CA,BG}^{-}$-" and insert -- *$H_{CA,BG}^{-1}$- --, therefor.

In column 17, line 35, in Claim 8, delete " $\rho_0 + \rho_1{'}r + \rho_2{'}r^2$," and insert -- $\rho_0 + \rho_1 r + \rho_2 r^2$, --, therefor.

In column 18, line 52, in Claim 10, delete "*$H_{CA,RG}^{-1}$)" and insert -- *$H_{CA,RG}^{-1}$), --, therefor.

In column 18, line 57, in Claim 10, delete "*$H_{CA,BG}^{-1}$" and insert -- *$H_{CA,BG}^{-1}$), --, therefor.

In column 22, line 34, in Claim 18, delete "a is" and insert -- σ is --, therefor.

Signed and Sealed this
Seventeenth Day of May, 2011

David J. Kappos
*Director of the United States Patent and Trademark Office*